United States Patent [19]

Bergna

[11] 4,217,240
[45] Aug. 12, 1980

[54] STABLE ALUMINOSILICATE AQUASOLS HAVING UNIFORM SIZE PARTICLES AND THEIR PREPARATION

[75] Inventor: Horacio E. Bergna, Wilmington, Del.

[73] Assignee: E. I. Du Pont de Nemours and Company, Wilmington, Del.

[21] Appl. No.: 861,397

[22] Filed: Dec. 16, 1977

Related U.S. Application Data

[63] Continuation-in-part of Ser. No. 809,362, Jun. 24, 1977, abandoned, which is a continuation-in-part of Ser. No. 719,717, Sep. 2, 1976, abandoned.

[51] Int. Cl.$^2$ ............................................. B01J 13/00
[52] U.S. Cl. ................................ 252/313 S; 208/120; 252/301.1 S; 252/317; 252/455 R; 252/455 Z; 260/583 J; 423/328
[58] Field of Search ............... 252/313 S, 301.1 S; 423/328

[56] References Cited

U.S. PATENT DOCUMENTS

| | | | |
|---|---|---|---|
| 2,688,003 | 8/1954 | Ryland | 252/455 R |
| 2,913,419 | 11/1959 | Alexander | 252/313 S |
| 2,941,958 | 6/1960 | Connor, Jr. et al. | 252/449 |
| 2,974,108 | 3/1961 | Alexander | 252/313 S |
| 3,252,917 | 5/1966 | Mindick et al. | 252/313 S |
| 3,346,509 | 10/1967 | Stewart | 252/453 |
| 3,766,057 | 10/1973 | Oguchi et al. | 208/143 |
| 3,782,075 | 1/1974 | Kirkland | 55/67 |

OTHER PUBLICATIONS

Shearon, Jr. et al.: "Silica–Alumina Petroleum Cracking Catalyst," 51 I & E Chemistry, pp. 720–726 (1959).

*Primary Examiner*—Richard D. Lovering

[57] ABSTRACT

An amorphous aluminosilicate sol with uniform size particles is prepared by a process comprising (1) preparing a sol of discrete colloidal particles of uniform size, the surface of which consists of a coating of an aluminosilicate by separately and simultaneously adding a silica sol or an alkali metal silicate solution and an alkali metal aluminate solution to a heel sol of uniform-sized colloidal particles of aluminosilicate, silica or refractory metal oxide(s) at a certain rate of addition at constant pH of 9 to 12 and T of 50° to 100° C. to deposit or coat aluminosilicate onto surface of heel sol particles, (2) ion exchanging the alkali metal ions of the sol from (1) for ammonium ions, and (3) filtering the sol from (2) to remove the cation exchange resin and optionally concentrating the sol to a solids content of up to 60% by weight.

6 Claims, 4 Drawing Figures

SPRAY DRIED POROUS AGGREGATE

AGGREGATE DIAMETER

PARTICLE DIAMETER

HOMOGENEOUS AMORPHOUS ALUMINOSILICATE

ALUMINO-SILICATE COATING

CORE

PORE VOLUME FORMED BY SPHEROIDAL PARTICLES

PORE

STABLE ALUMINOSILICATE AQUASOLS HAVING UNIFORM SIZE PARTICLES AND THEIR PREPARATION

CROSS REFERENCE TO RELATED APPLICATIONS

This is a continuation-in-part of copending application Ser. No. 809,362, filed June 24, 1977 and now abandoned that was a continuation-in-part of application Ser. No. 719,717, filed Sept. 2, 1976 and now abandoned.

BACKGROUND OF THE INVENTION

1. Field of the Invention

This invention relates to porous amorphous aluminosilicate powders having uniform pore sizes and uniform particle size aluminosilicate aquasols. More specifically, this invention relates to porous amorphous aluminosilicate powders having a uniform pore size, precursor aluminosilicate aquasols with uniform particle size and their preparation by drying said aquasols to a powder without gelling.

2. Prior Art

Silica gels which are dried to porous silica powders are considered to be masses of spheres of $SiO_2$ ranging from a few Angstroms up to several hundred Angstroms in diameter, which are aggregated together in a three-dimensional mass. Vysotskii ["Adsorption and Adsorbents" (No. 1), John Wiley & Sons, N.Y., 1973, p. 101] states that globular particles of silica form the skeleton of gels and that the cavities between the spherical particles constitute the pores in silica gels. This structure of silica gels is further described in detail by R. K. Iler, "The Colloid Chemistry of Silica and Silicates", Cornell University Press, Ithaca, N.Y., 1955, p. 129. The pore size and pore uniformity of silica is related to the particle size and particle uniformity.

U.S. Pat. No. 3,782,075 discloses a silica packing material for chromatographic columns having uniform-sized porous microspheres having substantially all of the microspheres in the range of from 0.5D to 1.5D where D is the average diameter.

It is known to react sodium silicate, sodium aluminate, and an acid, or sodium silicate, aluminum sulfate, and an acid to form a gel or precipitate of aluminosilicate directly. However, the prior art does not teach any method for controlling the ultimate size of aluminosilicate particles which eventually aggregate to form the gel structure or the preparation of the ultimate particles of uniform size. The control of the pore size distribution, namely the size distribution of spaces between these primary globules or aluminosilicate particles is likewise not known.

The difficulty of making aluminosilicate sol particles from which uniformly porous gels and powders can be formed is exemplified by Kontorovich, et al., J. of Colloid Chemistry, USSR (English translation), Vol. 35, p. 864, 1973 (Kolloyd, zhur, p. 935). Aluminosilicate particles, made simply by mixing sodium silicate, sulfuric acid, and aluminosulfate, showed a wide distribution of radii such that, for example, where the commonest particle radius was 20 Å, a large fraction of the particles were also as large as 60 Å radius. He further points out that even when the gels are aged for growth, the particles grow only to about 35 Å, even after long exposure in water at 70° C. He states definitely that the presence of aluminum in the globules hinders the increase in the size of the particles. This puts a limit in the Al content for certain particle sizes.

The nonuniformity of pores of amorphous aluminosilicates is exemplified in U.S. Pat. No. 3,346,509 which discloses the preparation of silica-alumina compositions with a preponderance of the pore volume in pores of small radii. The pore radii are disclosed as ranging from above 200 Å to less than 10 Å with up to about 60% in the range of 10 Å to 20 Å.

U.S. Pat. No. 3,766,057 discloses an alumino-silica gel dried to a powder having a mean pore radius of 40 Å to 100 Å and 15% of the pore volume in a 10 Å section with a wide distribution of particles in the adjacent particle sizes.

Making aluminosilicate sols of particles of 3 to 150 millimicrons in diameter which are uniform in chemical composition was described by G. B. Alexander in U.S. Pat. No. 2,974,108, issued Mar. 7, 1961. In U.S. Pat. No. 2,913,419, issued Nov. 17, 1959, Alexander discloses the preparation of gels and particles having a skin or outer surface of aluminosilicate composition. The gels have a coarse structure to permit coating with aluminosilicate without closing the pores in the gel. There is no disclosure of the need for uniform pores or for the preparation of uniform pore sizes or the control of the pH at a constant value between 9 and 12. Alexander's particles are used as filters while his gels are used as catalysts.

In porous catalyst powders, the uniformity in pore size is a definite advantage in affording specificity of reaction by avoiding side reactions and preventing the deposition of carbonaceous residues. Heretofore, it has not been possible to produce amorphous aluminosilicate catalysts with a uniform pore size.

SUMMARY OF THE INVENTION

Now it has been found that aluminosilicate porous powders with uniform pore size distribution comprising spheroidal colloidal particles of uniform size can be prepared by first growing uniform size particles at a constant pH to prepare a uniform particle size amorphous aluminosilicate sol and then drying said uniform particle size sol to a powder without gelling the sol.

The compositions of this invention, which are particularly useful as a catalyst, consist essentially of uniformly porous powders comprising spheroidal colloidal particles of uniform size packed into porous aggregates having a uniform pore diameter between the particles, a bulk density of 0.5 g/cc or more, preferably from 0.5 to 0.9 g/cc and a specific surface area of 30 to 750 m²/g of said particles having a surface of amorphous aluminosilicate.

The uniform spheroidal discrete colloidal particles of the sol to be dried have particle diameters which range from 3 to 90 nanometers.

The spheroidal particles have a coating that consists of an amorphous aluminosilicate. Said aluminosilicate is coated or deposited on a pre-formed core of more or less spheroidal colloidal particles which may or may not have the same composition as the deposited aluminosilicate. For catalytic activity it is only essential that the required colloidal particles have a coating or surface of catalytically active amorphous aluminosilicate. This coating composition extends within the surface to a depth of at least 0.5 nanometer, preferably 0.5 to 1.5 nanometers. Although this composition can extend to a depth of greater than 1.5 nanometers, depths greater than 1.5 nanometers are seldom required.

The spheroidal particles are coated with an amorphous hydrous aluminosilicate compound comprising one or more cations selected from the group consisting of sodium, potassium, hydrogen, ammonium and Group I to VIII metals selected from the group consisting of Cs, Li, Mg, Ca, Sr, Ba, Sc, Ti, V, Cr, Mn, Fe, Co, Ni, Cu, Y, Zr, Nb, Mo, Tc, Ru, Rh, Pd, Ag, La, Ce, rare earth metals, Hf, Ta, W, Re, Os, Ir, Pt, Au, Sn, Cd, Bi and Sb. The interior of the spheroidal particles is also composed of said aluminosilicate except to the extent that the nuclei or core may be a refractory metal oxide or silica.

The aluminosilicate chemical composition may be defined by the following formula:

$$M_{\frac{x}{v}} [(AlO_2)_x(SiO_2)_y]_n \cdot wH_2O$$

where x and y are the number of moles of $AlO_2$ and $SiO_2$ respectively, the molar ratio of y:x being from 1:1 to 19:1 of Si:Al, and w is the moles of bound water, M is one or more metal cations selected from the group consisting of Li, Na, K, H, $NH_4$, Cs, Ru, Mg, Ca, Sr, Ba, Sc, Ti, V, Cr, Mn, Fe, Co, Ni, Cu, Y, Zr, Nb, Mo, Tc, Ru, Rh, Pd, Ag, La, Ce, rare earth metals, Hf, Ta, W, Re, Os, Ir, Pt, Au, Sn, Cd, Bi and Sb; and v is the valence of M. It is understood that where there are, e.g., three metals, the term $M_{x/v}$ would include each metal and its valence. The cations represented by M are preferably selected from one or more of the group consisting of ammonium, hydrogen, Cs, Li, Mg, Ca, Sr, Ba, Sc, Ti, V, Cr, Mn, Fe, Co, Ni, Cu, Y, Zr, Nb, Mo, Tc, Ru, Rh, Pd, Ag, La, Ce, rare earth metals, Hf, Ta, W, Re, Os, Ir, Pt, Au, Sn, Cd, Bi and Sb. What is meant by one or more is that in the replacement of sodium or potassium with one or more metal cations listed, there will be replacement to the extent the sodium or potassium is replaceable with one or more metal cations. Thus in addition to the one or more metal cations, some unreplaced sodium or potassium will remain.

Generally the aluminosilicate of this invention is produced in the form where M is sodium or potassium. The sodium or potassium aluminosilicate is ion exchanged so that it is largely ammonium aluminosilicate although some sodium or potassium aluminosilicate still remains. The ammonium aluminosilicate can be heated to drive off the ammonium to give hydrogen aluminosilicate. The final form of the powder is generally ammonium or hydrogen aluminosilicate. However, where it is desired to replace the ammonium or hydrogen with one or more metals indicated above for M, the sol before drying may be ion exchanged to yield the aluminosilicate with the desired metal or metals. In such a case, a small amount of ammonium and/or hydrogen aluminosilicate also remains.

The powder compositions of this invention may also have a surface layer over the aforesaid aluminosilicate coating of one or more of the following metal or metal oxides which may be in the cationic form, partially replacing M: Li, Cs, Rb, Mg, Ca, Sr, Ba, Sc, Ti, V, Cr, Mn, Fe, Co, Ni, Y, Zr, Nb, Mo, Tc, Ru, Rh, Pd, La, Ce, the rare eath metals, Hf, Ta, W, Re, Os, Ir, Pt, Cu, Ag and Au. The most preferred aluminosilicate chemical composition is where M is ammonium or hydrogen or mixtures thereof.

Thus, in accordance with the invention, a uniformly porous powder composition has been found which comprises porous aggregates of spheroidal particles which are 3 to 90 nanometers in size and nonporous to nitrogen and contain:

(a) a core of silica, aluminosilicate or one or more refractory metal oxides selected from alumina, zirconia, titania, thoria and rare earth oxides;

(b) a coating around said core of at least 0.5 nanometer in depth of an amorphous hydrous aluminosilicate compound having a molar ratio of Si:Al of from 1:1 to 19:1 and comprising one or more cations selected from sodium, potassium, ammonium, hydrogen and Groups I to VIII metals selected from Cs, Li, Mg, Ca, Sr, Ba, Sc, Ti, V, Cr, Mn, Fe, Co, Ni, Cu, Y, Zr, Nb, Mo, Tc, Ru, Rh, Pd, Ag, La, Ce, rare earth metals, Hf, Ta, W, Re, Os, Ir, Pt, Au, Sn, Cd, Bi and Sb; and (c) a surface layer over said coating of 0 to 15% by weight of a metal or metal oxide selected from Cs, Li, Mg, Ca, Sr, Ba, Sc, Ti, V, Cr, Mn, Fe, Co, Ni, Cu, Y, Zr, Nb, Mo, Tc, Ru, Rh, Pd, Ag, La, Ce, rare earth metals, Hf, Ta, W, Re, Os, Ir, Pt, Au, Sn, Cd, Bi and Sb; said powder composition having a specific surface area of 30 to 750 m²/g, a bulk density of 0.5 g/cc or more and substantially uniform size pore diameters of from 20 Å to 250 Å, with pore diameters of 20 Å to 45 Å having a uniformity such that at least 90% of the pore volume is made up of pores of from 0.6D to 1.4D and pore diameters of 45 Å to 250 Å having a uniformity such that at least 80% of the pore volume is made up of pores of from 0.6D to 1.4D, where D is the median pore diameter. A particularly useful powder is one with pore diameters of 20 Å to 150 Å with a uniformity such that at least 90% of the pore volume is made up of pores of from 0.6D to 1.4D. An even more uniform powder within the scope of the aluminosilicate powders of this invention is one with pore diameters of 20 Å to 150 Å with a uniformity such that at least 90% of the pore volume is made up of pores of from 0.7D to 1.3D. The porous aggregates of this invention may range in size from 2 to 500 microns.

The aluminosilicates of this invention are prepared by a process comprising:

(a) preparing a heel sol of discrete colloidal particles selected from sodium, potassium or ammonium aluminosilicate, silica and one or more refractory metal oxides selected from the group consisting of titania, alumina, zirconia, lanthana, thoria and rare earth metal oxides, said heel sol comprising particles of a substantially uniform diameter within the range of 2 to about 85 nanometers, the initial concentration in the heel sol of sodium, potassium, ammonium aluminosilicate or total refractory metal oxide being at least 0.2% by weight with the particles stabilized against aggregation in the pH range 9 to 12;

(b) adding to said heel, separately but simultaneously, two feed solutions, one being a solution of sodium or potassium silicate having from 1 to 36 grams of silica per 100 cc, or a sol of silicic acid containing from 1 to 12% silica, the other being a solution of sodium or potassium aluminate containing from 1 to 15% alumina, said feed solutions being added in relative rates and proportions to maintain a constant molar ratio of Si:Al in the feed streams of from 1:1 to 19:1 with the rate of addition of silica not to exceed 10 grams of $SiO_2$ per 1000 square meters of total surface area of particles in the heel sol per hour;

(c) maintaining the pH of the heel sol at a constant value between 9 and 12 by adding a cation exchange resin in the hydrogen or ammonium form until the particles in the heel sol have attained an increase in diameter of at least 1 nanometer and a maximum size of 90 nanometers;

(d) filtering the sol from (c) to remove the cation exchange resin and optionally adjusting the concentration of the resulting aluminosilicate sol to a solids content of up to 60% by weight; and (e) drying the resulting substantially gel-free sol of particles having an aluminosilicate surface to a powder by removing water at a rate at which no gelling will occur.

Accordingly, the uniform size amorphous aluminosilicate particle sols of this invention are produced by steps a, b and c of the aforesaid process followed by removal of the exchange resin. The uniformity of said particles is such that the maximum standard deviation of the particle size is 0.37d where d is weighted average particle size diameter.

Thus, the amorphous aluminosilicate sols of this invention have uniform particles of from 3 to 90 nanometers in diameter with a molar ratio of Si/Al of 1:1 to 19:1, said uniformity defined by particles having a maximum standard deviation of 0.37d, where d is the weighted average particle size diameter.

The sol from (d) may be ion exchanged to remove the sodium or potassium ions by contacting it with a strong acid type of cation exchange resin in the ammonium form, after which the solids concentration may be adjusted to the range of 10 to 60% by weight before drying the substantially gel-free aluminosilicate sol to a powder by removing the water at a rate at which no gelling will occur.

In the process of making the sol of this invention, the silica reacting with the aluminate ions is either largely monomeric or polymeric. When the silica is monomeric, most of the individual silicon atoms become associated directly with the $AlO_2^-$ ions forming $SiAlO_4^-$ ions in the colloidal particles, accompanied in the colloidal particle by the alkali ion present in the reaction such as $Na^+$. On the other hand, in conventional gel processes, substantially more of the silica is polymerized before it can be linked to alumina, therefore less silica units are directly associated with alumina. For these reasons the aluminosilicate compositions of this invention are believed to have a more uniform $SiO_2$ to $AlO_2$ distribution than the conventional silica-alumina gels. This kind of uniformity at a submicron range scale combined with narrow pore size distribution is of great importance in determining the performance of this composition as catalysts and catalyst supports, for example when mixed with active zeolite catalysts.

It will be understood that even when the heel sol is a refractory oxide or silica or aluminosilicate, the particles in the final sol product will have a coating of aluminosilicate and are referred to herein as an aluminosilicate sol.

The powders of this invention have substantially uniform pore sizes because the particles in the aluminosilicate sol before drying are substantially uniform in diameter. The uniform particle size of the sol results because the two individual species, the aluminate ions and silica or silicate ions, are not allowed to react to form new particles or precipitate. The aluminate ions and silica or silicate ions are converted to soluble forms of alumina and silica or silicate which are deposited on the substantially uniform sized nuclei or initial particles in the heel. When the alkaline solutions of silicate and aluminate are added, the pH of the mixture, but for the addition of ion exchange resin, would rise. The addition of ion exchange resin is regulated to maintain the pH constant in the range of 9 to 12. This control of pH and the maximum addition rate of silicate and aluminate described hereinafter (10 g of $SiO_2$ per 1000 sq. meters of surface area per hour) results in the aluminosilicate particles being of the uniformity described herein.

The powders of this invention have an average pore size which depends on the average particle size of the precursor aluminosilicate aquasol. The aquasol is in turn obtained by deposition of sodium or potassium aluminosilicate on colloidal nuclei particles in the heel sol. For these reasons the selection of the heel sol has to be made on the basis of what properties are required in the final powder and on the amount of aluminosilicate that is to be deposited.

In the process of the present invention what is meant by constant pH is maintaining the pH within ±0.2. The addition of a cation exchange resin in the hydrogen or ammonium form removes sodium ions and prevents the accumulation of sodium salt in the reaction medium that would cause coagulation of the colloidal particles.

Once the required spheroidal particles have been formed containing cations of sodium or potassium, there are the following ways in which the final powder of the invention can be made, depending on what cations are desired in the final product:

(a) The sodium or potassium ions in the sol may be ion exchanged, e.g., by hydrogen or ammonium ions and then the sol converted to powder by removing water.

(b) One or more cations of metals described herein to enhance catalytic activity may be added in limited amounts to the sol to partially replace hydrogen or ammonium ions before forming the powder.

(c) The sol containing the original sodium or potassium ions may be converted to powder and then the sodium or potassium ion exchanged for ammonium or one or more of the metal cations described herein. In this instance, removal of all sodium or potassium from the powder is substantially attained only where the pores of the powder are large and only the outer surface of the spheroidal particles consists of aluminosilicate.

(d) In carrying out alternative (b) and (c), more cation metal may be used than required for ion exchange if it is desired to leave a thin film of metal on the aluminosilicate surface. Said metal deposited on the aluminosilicate is converted to hydroxide and oxide when the aluminosilicate is dried and calcined.

The metal cations of Groups I to VIII of the Periodic Table referred to herein include Group 1A, except for Fr, Group 1B, Group 2A, Group 2B, except for Hg, Group 3B, except actinium, Group 4B, Group 5B, Group 6B, Group 7B, Group 8 and Sn, Sb and Bi.

The aluminosilicate powders of the present invention are made by drying sols of spheroidal discrete colloidal uniform sized particles to obtain dried aggregates of said particles in which the spheroidal particles are closely packed together. The narrow pore size distribution of the powder of this invention is attainable with porous aggregates ranging in size from 2 to 500 microns, preferably 10 to 200 microns, although considerably larger powder grains can be obtained, depending on the method of drying. The uniform individual particles that compactly agglomerate to form the powders of this invention are selected from the range from 3 to 90 nanometers in diameter, depending on the desired resulting pore size.

It is most important that loose aggregation of the particles or formation of gel networks of linked particles does not occur before water is removed. Otherwise, particles become linked together in open three-dimensional networks in the sol. These open networks do not completely collapse upon removal of water and drying, thus leaving some pores appreciably wider than those remaining when the spheroidal particles are closely packed together upon being dried.

Most simply stated, drying should occur before aggregation or gelling occurs in the sol. One way to obtain a mass of close-packed colloidal particles is to force the water under pressure out of a sol through microporous membrane against which the silica particles become packed, and then drying the water from the wet solid filtercake. However, the most convenient way is to concentrate the sol as much as possible, such as to a solids content of 10 to 60% by weight, without aggregating the particles and then to dry suddenly as by spray drying. In this case, the sol is concentrated rapidly in spheroidal droplets and the surface tension of the water compresses the mass of particles, forcing them together in spite of the mutual repulsion due to the ionic charge on the surface, until they are randomly closely packed.

Figure 1:
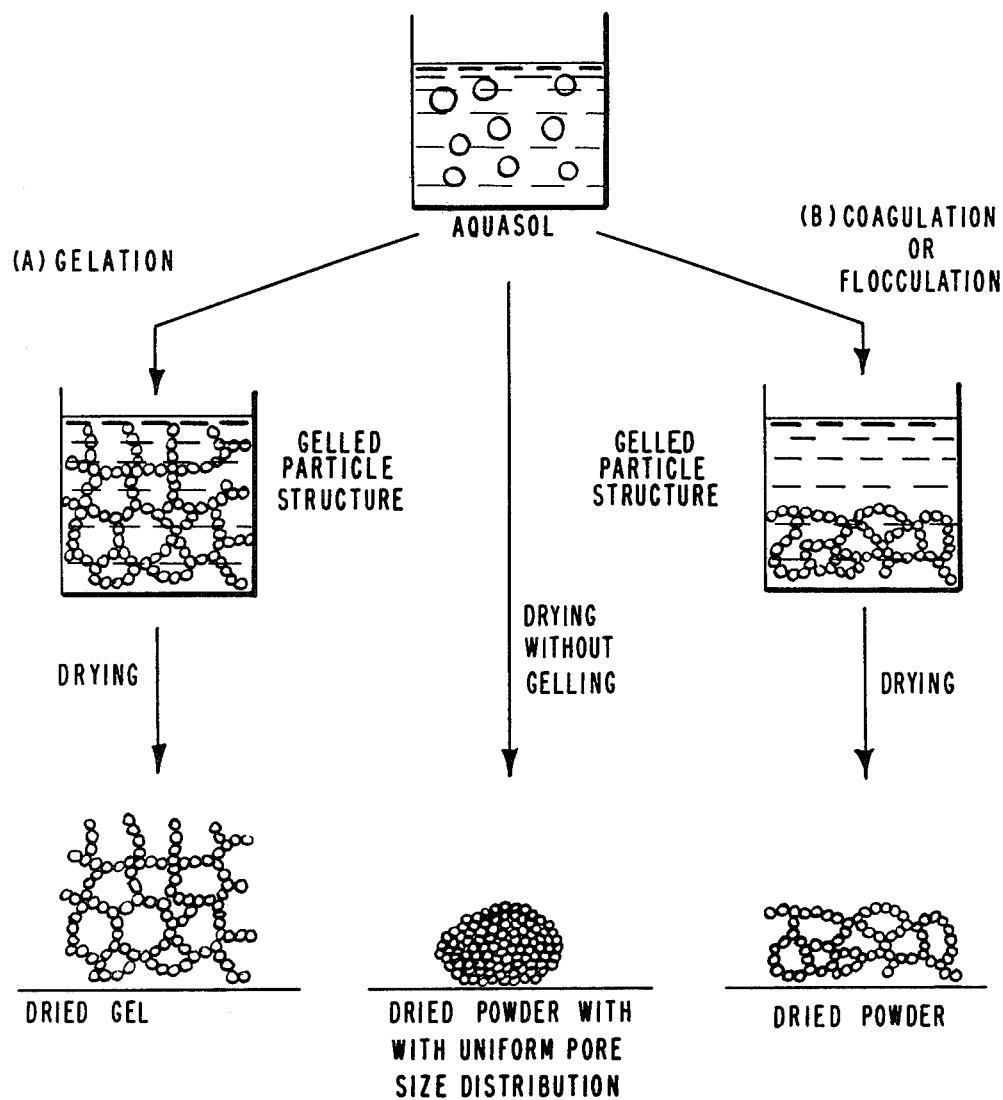
FIG. 1 is an illustration of the dried particle structure of the aquasol of this invention in contrast to structures after gelation, coagulation or flocculation.

Referring now to FIG. 1, the gel structure formed after drying is shown after (a) gelation or (b) coagulation or flocculation of the aquasol of this invention. The dried structure of this invention with uniform pore size distribution is also shown after drying without gelation.

Figure 2:
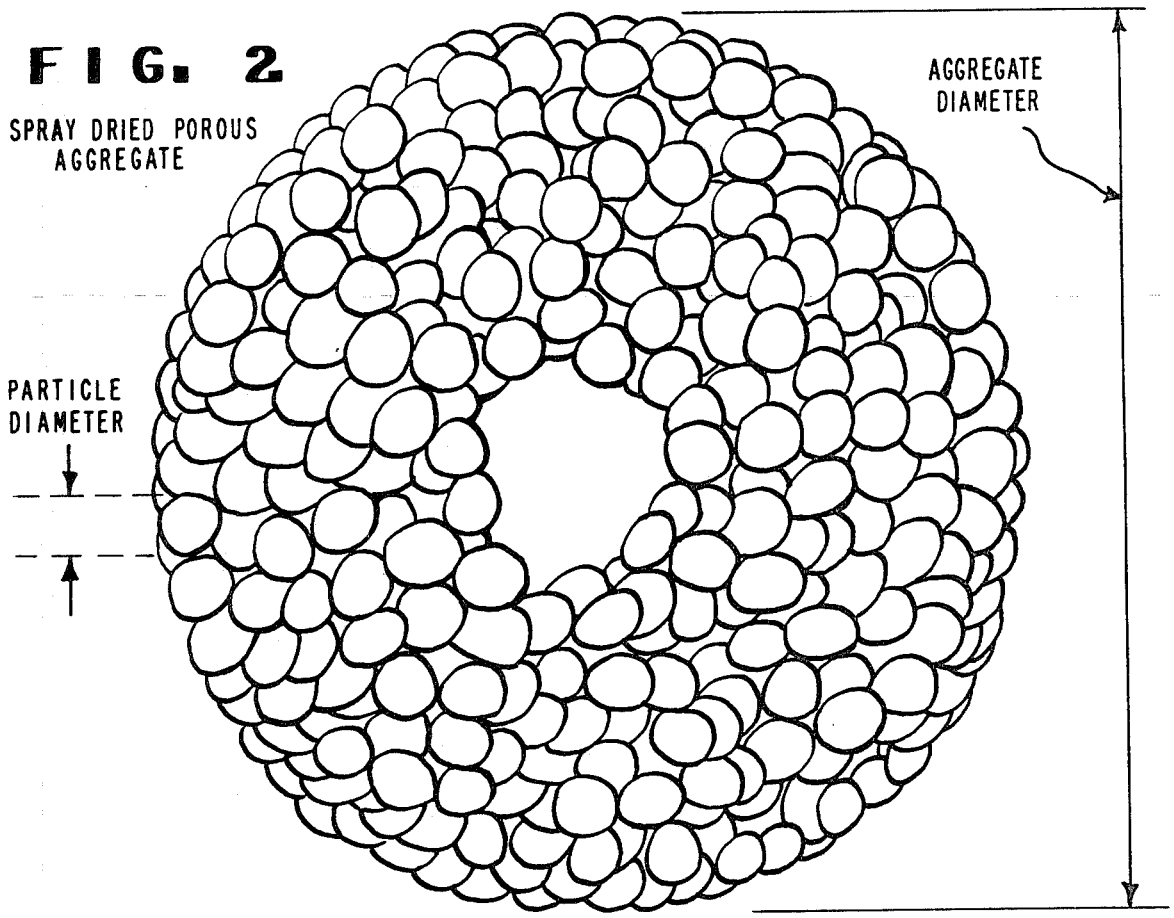
FIG. 2 is a drawing of a spray dried porous aggregate of this invention.
Figure 3:
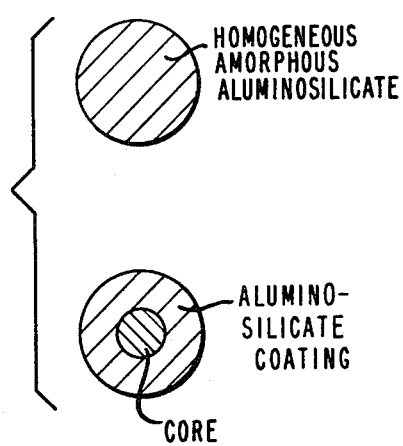
FIG. 3 is a cross section of a particle making up the aggregate where the particle is homogeneous and where there is a core of a refractory oxide.

Referring now to FIG. 2, the spray dried aggregates of particles of this invention is shown in a spheroidal shape to illustrate the uniform packing of the particles to form the aggregate. The individual particles making up the aggregate may be homogeneously an amorphous aluminosilicate or may have a core of silica, aluminosilicate or one or more refractory metal oxides with a coating of said aluminosilicate as illustrated by FIG. 3.

Figure 4:
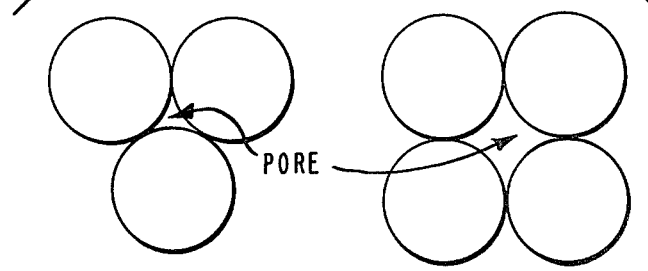
FIG. 4 illustrates the pore volume formed by the spheroidal particles of this invention.

FIG. 4 was merely included to illustrate the pore volume of this invention and its formation by the particles.

The theory of the shrinkage forces in drying water from wet masses or gels of colloidal silica has been described by R. K. Iler in "Colloid Chemistry of Silica and Silicates" (Cornell University Press) 1955, pages 140 to 143. The nature of the resulting gel or aggregate masses has been discussed by R. K. Iler in a monograph on "Colloidal Silica" in Surface and Colloid Science, Vol. 6, edited by E. Matijevic (John Wiley & Sons, Inc.) 1973, pages 65 to 70. The principles relating to colloidal silica also apply to the present sols which are converted to powders.

The colloidal particles which bear the highest ionic charge and which exert the greatest mutual repulsion in the end, form the most closely packed aggregates. The reason is that as the sol becomes concentrated the particles still repel each other and do not join together even when they are much closer to each other than their own diameter. Thus, the uniform spheroids remain uniformly distributed as further water is removed, until the concentration reaches the point where all the particles are forced into contact at about the same time so that the spaces or pores between them are uniform in size.

If, however, the particles in the sol begin to form open three-dimensional aggregates, or "gel phase" as described by Iler in "Colloidal Silica", page 45, then these particles are no longer free to move together uniformly as the sol becomes very concentrated and when dried such particles are not fully closely packed and larger irregular pores then remain in the powder.

Since aggregation of the particles in a sol to form a gel is not an instantaneous process but generally occurs over a period of hours or days, the sol of this invention must be dried as rapidly as possible or before gelling at as low a temperature as consistent with rapid drying. Generally speaking, the sols suitable for drying do not gel in less than about an hour so that drying within one hour is desirable.

Spray drying is a preferred procedure not only because drying is rapid, but because the powder product is obtained as porous spheres typically 5 to 200 microns in diameter which are especially useful as catalysts.

The surface of the powder consists of an aluminosilicate at least to the depth of about 0.5 nanometer of the formula indicated above or it may contain a surface layer of the metal cations described in the following paragraph and amounting to 0 to 15% by weight.

In the general formula, the hydrogen or ammonium ions may be wholly or in part substituted by cesium, rubidium, lithium or metal cations selected from the group magnesium, calcium, strontium, barium, scandium, titanium, vanadium, chromium, manganese, iron, nickel, cobalt, copper, yttrium, zirconium, niobium, molybdenum, technetium, ruthenium, rhodium, palladium, silver, lanthanum and elements of the rare earth lanthanide series numbers 58 to 71 in the periodic system, thorium, uranium, hafnium, tantalum, tungsten, rhenium, osmium, iridium, platinum, gold, bismuth, cadmium, tin and antimony.

The core of the spheroidal particles consists of the pre-formed colloidal particles on which the aluminosilicate is deposited. The chemical nature of the interior of the particles plays no direct role in catalysis, since the particles are nonporous to organic molecules. However, the pre-formed particles must be thermally stable and provide a suitable physical substrate for the aluminosilicate on the surface. Thus, the core may consist of aluminosilicate, of any ratio of Si:Al from 1:1 to 99:1, and preferably 1:1 to 19:1, silica or one or more refractory oxides having a melting point over 1600° C., which can be pre-formed as an aqueous sol of relatively uniform, more or less spheroidal colloidal particles from 2 to 87 nanometers in diameter. Typical refractory oxides are alumina, zirconia, titania, lanthana, thoria and rare earth oxides. However, such preformed particles must be of such uniform size that after the aluminosilicate has been deposited, the final particles will meet the above requirement of uniformity. It will be noted that even if the pre-formed colloidal particles are cubic crystals of a refractory oxide, the shape becomes more rounded as amorphous aluminosilicate is deposited as an increasingly thick coating. If the pre-formed particles are the same as the aluminosilicate being deposited, then the particles are homogeneous and are simply grown in size.

The core material is supplied in the form of an aquasol, the preparation of which is known in the art. The size of the particles in the aquasol comprising the heel or core of the particles making up the powders of this invention can vary rather widely in view of the particle size range of 2 to 87 nanometers. The powder of this invention with large pores, would have, for example, large colloidal particles of 50 nanometers in diameter. These large particles may have an aluminosilicate surface or coating as little as 0.5 nanometer in thickness. Thus 83% of the volume of such particles may consist of a core material which may be a refractory oxide such as silica or alumina. Thus in this case, aluminosilicate comprises only a minor part of the weight of the powder. On the other hand, the ultimate colloidal spheroidal particles making up the powder grains may consist throughout of aluminosilicate.

The powders of this invention with cores of a very stable refractory are more resistant to sintering than when they consist entirely of aluminosilicate. Thus, when the cores of spheroidal particles of this invention comprise more than 50% of the volume of refractory particles, the powders of this invention are more resistant to sintering which would close the pores thereof. The aluminosilicate surface may sinter and flow to some extent, but the thermally stable cores prevent collapse of the structure and closing of the pores. Thus, high surface area can be retained and by suitable partial rehydration of the aluminosilicate surface catalytic activity can be restored.

The colloidal particles in the heel or starting sol which constitute the core on which aluminosilicate is to be deposited must meet a number of requirements:

(a) The particles must be of generally spheroidal or equidimensional in width, thickness and breadth, with an average diameter of 2 to about 87 nanometers. Thus in making aluminosilicate-coated particles 3 nanometers in diameter, if the thickness of the aluminosilicate coating is 0.5 nanometer and the diameter of the heel sol particle is 2 nanometers, the final diameter will be 3 nanometers. If it is 1.5 nanometers in thickness and the heel particles are 87 nanometers in diameter, the final particles will be 90 nanometers in diameter. As will be explained, the thickness of the deposited aluminosilicate should be greater when the particles of the heel sol are of a different composition from the coating.

(b) The heel sol particles must be physically and chemically stable at high temperature. The refractory metal particles of the heel are characterized as having a melting point in excess of 1600° C.

(c) The heel sol particles must be of a substance that can be made in the form of an aqueous sol of colloidal particles of uniform size.

The heel sol particles constituting the core of the particles making up the powders of this invention are selected from silica, a sodium or potassium aluminosilicate having a Si:Al molar ratio of from 1:1 to 99:1, preferably 1:1 to 19:1 and one or more refractory metal oxides selected from the group consisting of alumina, zirconia, titania, thoria and rare earth oxides. The preferred refractory metal oxide is selected from alumina, zirconia and titania. The preferred heel particles are selected from silica, sodium or potassium aluminosilicate having a Si:Al molar ratio of from 1:1 to 19:1, alumina, zirconia and titania.

The preparation of such heel sol particles in the form of an aqueous sol is known in the art. Colloidal silica of uniform size has been described by R. K. Iler in "Colloidal Silica", in Surface and Colloid Science, Volume 6, E. Matijevic Editor (John Wiley & Sons, Inc.) 1973, page 1. U.S. Pat. No. 3,370,017 discloses the preparation of alumina sols of many types. U.S. Pat. No. 2,974,108 discloses aluminosilicate sols. U.S. Pat. Nos. 3,111,681 and 2,984,628 disclose zirconia sols. U.S. Pat. No. 3,024,199 discloses sols of the rare earth oxides. Most refractory oxides can be made in the form of a stable aqueous sol except those such as calcium oxide, barium oxide or magnesium oxide, which tend to hydrate or dissolve to an undesirable extent in water. It should be understood that colloidal hydrous oxides, in which the oxide in the colloidal particle is chemically hydrated with some bound water that cannot be removed by vacuum at ordinary temperature, is satisfactory for the present purpose, unless the loss of water at elevated temperature results in a gross shrinkage of the core within the aluminosilicate particle.

Even if the small heel particles initially have a cubic or other approximately equidimensional shape, they become rounded when enough aluminosilicate coating has been deposited to form the spheroidal shape of the final sol particles.

If the available refractory oxide sol is not of sufficient uniform particle size, a fraction of suitable uniformity must be isolated by means known to those skilled in the art of colloid chemistry, such as fractional sedimentation or centrifugation.

The refractory oxide sols must be so constituted that the particles remain nonaggregated in a pH range wider than that at which the aluminosilicate is deposited, namely 9 to 12. Many refractory oxides including alumina, zirconia and thoria are stable by virtue of a positive charge on the particles with nitrate or chloride counter-ions at a pH below 5 or 6. Ordinarily, when the pH of such a sol is raised to 7 or 8 or higher, the particles coagulate or gel.

To stabilize such sols at pH above 7, those skilled in the art are familiar with techniques for reversing the charge on the particles by adding an excess of multivalent ions that are strongly adsorbed on the oxide particles at low pH and put a negative charge on the particles. Then the pH can be raised to the alkaline side with ammonia or sodium hydroxide. Citric or tartaric acid is often used for this purpose. Enough of said acid is added, to the oxide sol which is below pH 6, to furnish one or two acid molecules per square nanometer of colloid oxide surface, before the pH is raised to the desired range. In some instances, the charge of a positive oxide sol can be reversed by adding it in a thin stream at a point of intense agitation in a solution of sodium polymetaphosphate or sodium silicate. When the aluminosilicate deposition of this invention begins, it can displace the organic cations from the oxide particles, but generally not polymetaphosphate, which remains in the product. For this reason, the phosphate is less preferred.

Where very small particles are required in the heel, e.g., an aluminosilicate sol of particles less than 5 or 10 nanometers in diameter, it is preferable to prepare the particles as a heel just before the aluminosilicate is deposited. Where very small silica particles are wanted as nuclei, sodium silicate is added to water to obtain a silica concentration of 0.5 to 1.0% and the pH is adjusted to 8 to 10.5 with ion exchange resin at a temperature of 30° to 50° C. Initially, colloidal particles as small as 1 nanometer are formed and these grow in size spontaneously while diminishing in numbers. When the desired size is reached, the temperature is raised to at least 50° C. and deposition of the aluminosilicate according to the process of the invention is begun.

Similarly, small particles of sodium aluminosilicate can be attained in the heel by adding to water sodium silicate and sodium aluminate solutions to achieve the desired ratio of Si:Al and the combined concentration of $SiO_2$ plus $Al_2O_3$ of 0.2 to 0.5%. The pH is adjusted to 8 to 12, and the solution warmed to 50° C. before the deposition of aluminosilicate according to the process of the invention is begun.

Initially in such heel solutions, polymerization of the oxide occurs with initial equilibrium formation of clusters containing various numbers of molecules. Clusters that are smaller than a certain critical size have a tendency to redissolve, while clusters that are larger than this critical size will have a tendency to grow. Such critical size clusters of molecules are referred to in the art and herein as nuclei. In general, the term nuclei implies clusters of molecules or very small colloidal particles which are not in equilibrium with the dispersing medium and have a strong tendency to grow into larger particles.

Thus to make the smallest aluminosilicate particles the heel in the process of the invention can consist of water dispersions of nuclei of silica or aluminosilicate, said nuclei being freshly formed clusters of small particles having a tendency to grow and form larger particles. For somewhat larger particles, the heel can consist of a water dispersion of silica or aluminosilicate particles rather than nuclei, in equilibrium with the water.

For very small nuclei of refractory oxide around 2 nanometers in diameter, certain basic salts may be used providing they are suitably converted to stable negatively charged particles. Thus, basic aluminum chloride having the empirical formula $Al_2(OH)_5Cl$ actually consists of hydrated alumina units containing about 13 aluminum atoms bearing positive charges, surrounded by chloride ions in solution, as disclosed by Georg Johansson, Acta Chemica Scandinavica, Volume 14, page 771, 1960. By adding a dilute solution of the basic aluminum chloride, containing, for example, 0.3% by weight of equivalent $Al_2O_3$, to a very strongly agitated solution of ammonium citrate so as to have present at least one citrate ion per chloride ion, a negatively charged complex is obtained. To this a dilute sodium silicate solution can then be added in an amount such that there are several silicate ions present per aluminum atom. When the sodium is removed by exchange with a cation exchange resin in ammonium form and the solution heated to 50° C., there is obtained a sol of silica coated alumina nuclei on which aluminosilicate may then be deposited by the process of this invention until a particle size of 3 or 4 nanometers has been attained suitable for making a powder having very fine uniform pores.

Commercially available aquasols with particle diameters from about 4 to 60 nanometers may be used as a heel in the process of the present invention. Silica aquasols are used as nuclei where the silica composition of the core is not deleterious to the properties, most notably the thermal stability and the catalytic activity, of the final product.

As a general statement about forming very small particles of refractory oxides by hydrolysis of salts, the process of nucleation is influenced by several factors, especially those that affect the solubility of the nuclei. The rate of formation of nuclei of a solid in water depends on the degree of supersaturation. The less soluble the substance formed, the higher will be the supersaturation, and thus there will be present more and smaller nuclei. Since solubility in water increases with temperature, the supersaturation level decreases with increasing temperature. Thus, the lower the temperature, the more nuclei present and the smaller the nuclei for a given heel and the higher the temperature the fewer nuclei and the larger the nuclei for a given heel.

Generally, the range of temperature at which silica nuclei are formed by deionization of sodium silicate is 30° to 100° C. In this case silica nuclei of about 1 to 6 nanometers in diameter are obtained. In the case of aluminosilicate sols the nuclei are formed at temperatures between 30° and about 50° C. At higher temperatures there may be some formation of coarse precipitates instead of discrete particles. However, although it is necessary in the case of the aluminosilicate to effect the deionization of the added soluble silicate and soluble aluminate at a relatively low temperature to obtain very small but discrete aluminosilicate nuclei, once a sufficiently large number of nuclei of said aluminosilicate have been formed, the temperature can be increased to as much as 100° C. to accelerate the build-up or growth of the particles.

The desired final particle size of the sol is dependent on the initial particle size nuclei of the heel and the amount of aluminosilicate to be deposited. When the final powder pore size desired requires small final particles of aluminosilicate, the initial heel should contain smaller particles. When small particles are used in the initial heel and the reactants build-up the nuclei to a larger particle, the core that constitutes the original nuclei has a negligible effect on the catalytically active surface of the final particles or powder. Thus, where the nuclei are silica and the build-up or deposit constitutes a substantial part of the final particle, the product is essentially a homogeneous aluminosilicate particle. In such cases the volume of original silica of the nuclei is negligible compared to the volume of the final particle and this small amount of silica has very little effect on the properties of the final aluminosilicate solution.

When the nuclei are larger, relatively smaller amounts of aluminosilicate may be built up around the nuclei, depending on the finally desired particle size and pore diameter. When these larger nuclei are alumina, some overall physical properties of the final product will be somewhat different from those where the particles are homogeneous aluminosilicate, for example, density, refractive index and thermal properties will be different. However, the surface properties will be the same.

particle size and concentration of the nuclei in the heel have an effect on the desired or practical build-up ratio. Build-up ratio (BR) is the ratio between the total weight of solids in the product sol and the total weight of the nuclei in the heel, assuming all the added alumina and silica has been deposited upon the nuclei.

It is possible to calculate the build-up ratio on the basis of relative volumes, assuming densities for the heel nuclei and the deposited aluminosilicate. When the ratio is calculated as total volume of solids in the final sol particles divided by the total volume of solids in the heel sol, it is possible to calculate the average particle diameter in the final sol from the build-up ratio and the particle size of the heel sol.

As an example of build-up ratio by weight, if we start with a one-liter heel with a concentration of 1 g/100 ml of aluminosilicate (total mass of nuclei 10 g) and during the process we add a total of one liter of sodium silicate solution with a concentration of 20 g SiO$_2$/100 ml and one liter of sodium/aluminate solution with a concentration of 5 g NaAlO$_2$/100 ml (total mass of SiO$_2$ NaAlO$_2$ 250 g), the result is about 3 liters of a sol containing 260 g of solids. The build-up ration in this case will be 260/10, or 26.

Assuming that all the silica and aluminate accrete or are deposited uniformly on the aluminosilicate nuclei, there will be a relationship between the build-up ratio $M_F/M_i$ (where $M_F$ is the mass of solids in the final product and $M_i$ is the mass of particles or nuclei initially) and the cube of the ratio between the particle diameter of the product $D_F$ and the nuclei diameter $D_i$:

$$BR = \frac{M_F}{M_i} = \left(\frac{D_F}{D_i}\right)^3$$

When the layers of new material formed on the nuclei are not porous to liquid nitrogen, the relationship between build-up ratio and specific surface area of the product ($S_F$) and the nuclei ($S_i$) as measured by nitrogen adsorption, will be $$\frac{M_F}{M_i} = \left(\frac{S_i}{S_F}\right)^3$$

However, it is pointed out that these formulae apply only when the density of the deposited aluminosilicate is the same as that of the nuclei particles. Where the densities are different, suitable corrections must be made.

Thus having selected the particle size or specific surface area of the final aluminosilicate sol, the formulae relating build-up ratio to particle sizes or surface areas and total masses or concentrations can be used to select the particle size and concentration of the required heel.

The nuclei or particles in the heel are caused to grow into a uniform particle size by the simultaneous but separate addition of a silica sol or a sodium or potassium silicate and sodium or potassium aluminate into a heel in the presence of a cationic exchange resin in the hydrogen or ammonium form for pH control. The nuclei or particles in the heel grow by an accretion process. The cationic exchange resin in the hydrogen or ammonium form may be added to the heel prior to the simultaneous but separate addition of the silica sol or the silicate and aluminate solutions, or it may be added at the time the addition starts or shortly thereafter. Thereafter said resin is added to maintain a constant pH ±0.2.

It is required that the rate of addition of silica or silicate and aluminate is not permitted to reach that point where the silicate and aluminate will react in solution and form new particles or a precipitate. The aluminate and silicate must be hydrolyzed and deposited as completely as possible on the nuclei. The build-up or growth of the nuclei in the heel is thus limited by the rate that will permit the molecules of silicate and aluminate to deposit on said nuclei. Generally, the silicate and aluminate must not be added at a rate greater than that by which 10 g of SiO$_2$ per 100 square meters of surface area is added to the system per hour. Generally, the addition of reactants will be such that 5 to 10 g of SiO$_2$ are added per 1000 square meters of surface area available in the system per hour. Rates of addition above the maximum specified above are undesirable because they will permit new nuclei to form which will result in nonuniform particle size in the final sol.

The procedure of the present invention involves adding the solutions supplying the silica and alumina simultaneously, but separately to the heel sol in which the particles are growing. Premixing the reactants results in the formation of a precipitate and therefore must be avoided. The heel is vigorously stirred during the deposition process to permit almost constant dispersion of the reactant solutions. The use of very thin feed tubes or jets for the introduction of reactants assists in the dispersion of the reactants. Generally, the discharge of the feed tubes is inside the liquid of the heel immediately above the agitation blades. The heel sol may be circulated from a reaction vessel through a centrifugal pump, through a mass of weak base ion exchange resin in ammonium form, and then back to the vessel while the feed solution is fed in at a point close to the pump impeller.

The pH of the heel must be controlled to remove the sodium or potassium of the reactants and control the solubility of the particles. The pH is held constant within ±0.2 units, preferably ±0.1 at a value between 9 and 12, preferably 10 to 10.5. The addition of the reactants at a lower pH such as 8 would result in the formation of additional nuclei, and less complete deposition of the aluminosilicate on the nuclei. This is because the maximum rate at which deposition can occur is lower at lower pH.

Generally, the temperature during particle growth is from 50° to 100° C. Particle growth below 50° C. may be achieved but relatively slowly. The higher the temperature, the faster the rate of growth, but in any case, the specified rate of addition of reactants should not be exceeded. Temperatures above 100° C. may also be used provided care is taken to avoid evaporation by using greater than atmospheric pressure. However, at sufficiently high temperature under pressure certain compositions of aluminosilicate, particularly sodium aluminosilicate with a Si:Al ratio of around 1:1, tends to crystallize and the desired amorphous layer on the nuclei is not deposited. Instead crystalline nuclei tend to form in suspension. The formation of such crystalline zeolite compositions should be avoided. On the other hand, aluminosilicate compositions with Si:Al ratios of 10:1 or 19:1 are less likely to crystallize and temperatures of up to 150° C. might be used if an economic advantage resulted.

The feed solution of sodium or potassium silicate may contain from 1 to 36% by weight of silica, preferably 15 to 25% silica. The most preferred concentration is 20% silica. Generally a feed solution of sodium silicate with a ratio of SiO$_2$:Na$_2$O of from 2.6 to 3.8 is preferred, while about 3.3 is most preferred.

The sodium or potassium aluminate solutions used in this invention may be purchased commercially, or they may be prepared from commercially available solid sodium or potassium aluminate. In preparing a solution of the aluminate, it is sometimes desirable to add excess alkali, e.g., NaOH or KOH or LiOH, in order to decrease the extent of hydrolysis of the aluminate, but the amount should be minimized so as to reduce the amount of ion exchange resin that is needed.

Freshly prepared or commercially stabilized solutions free from precipitate should be used in any case.

The aluminosilicate surface that results from the accretion of the sodium or potassium silicate and sodium or potassium aluminate onto the nuclei must have a Si:Al mole ratio of from 1:1 to 19:1. The concentrations and volumes of the added silicate and aluminate solutions must be such that they are within the above final ratio. This often places a restriction on the concentrations that can be used. The aluminate solution may be as concentrated as 15% by weight aluminate, but at that concentration the addition would have to be very slow to prevent local precipitation of aluminosilicate. Generally, a solution containing 5% aluminate is very convenient.

In the process of this invention the desired concentrations of silicate and of aluminate being added must be held constant, unless compensating changes in the flow rate are made. Once the ratio of Si:Al desired is determined, and the rate of silicate addition is selected, the corresponding aluminate solution feed is set. The maximum addition rate of 10 g of $SiO_2$ per 1000 square meters of surface area of the solids in the mixture per hour will thus limit the feed rate of both reactants.

Soluble electrolytes, such as sodium chloride, lithium carbonate or potassium nitrate, tend to coagulate the aluminosilicate particles. For this reason the heel and feed solutions should be essentially free of extraneous electrolytes such as those indicated. Salts liberating polyvalent cations should specifically be avoided during the build-up operation.

The build-up or growth is continued until the desired particle size is reached. At this point, the aluminosilicate particles contain sodium or potassium cations.

The uniform particle size aquasols of this invention have ion-exchange properties. Although the particles have ion-exchange properties they are nonporous to organic molecules. This indicates that the Al in this composition is in the 4-fold coordination state as M $AlO_2$ rather than in the 6-fold coordination state as $Al_2O_3$. Each aluminum in the 4-fold coordination is accompanied by a Na or K ion. For this reason, the maximum total exchange capacity can be calculated on the basis of the Si/Al mole ratio.

The actual exchange capacity for the various metal ions that can replace Na or K in the aluminosilicate aquasol can be measured by saturating the particles in the sol or powder with the specific ion, and either analyzing the amount of metal in the solution after separating the aluminosilicate solids or by removing the excess of added salts and analyzing the solid phase for the specific metal ion.

The aluminosilicate sol may be treated with various ion exchange resins to remove the sodium or potassium ions. In some cases with aluminosilicate of high Si:Al ratio the resin in hydrogen ion form may be used, but the ammonium form is preferred. Dowex 50W-X8, an ion exchange resin, is a strong acid cation exchange resin of sulfonated polystyrene-divinyl benzene type and is commercially available from Dow Chemical Co. The sodium or potassium aluminosilicate solution is converted to the ammonium form by passing the solution through an ion exchange column packed with wet Dowex 50W-X8 previously converted to the ammonium form.

The aluminosilicate solution may be adjusted in concentration by dilution with water or concentration to the range of 5 to 40% by weight solids content before ion exchanging.

When the aquasols are converted from the sodium or potassium form to the ammonium form the sols are less stable. For example, an aquasol of 3.7 nanometers particle size with a concentration of 8 weight percent at pH 7 is stable in the $Na^+$ form for at least 9 months at room temperature (R.T.) but the $NH_4^+$ form of the same sol forms a gel after about one month.

It is important to notice that since the aquasols are only precursors to the powder compositions, it is not required that they are stable for longer than the period of elapsed time between sol preparation and drying.

In general, the sols of the present invention before drying are at least temporarily stable at a pH in the range from 4 to 12. The lower pH limit depends on the Si/Al ratio: the higher the Si/Al ratio, the lower the pH limit of chemical stability for the sol. For example, a sol of Si/Al ratio of 1/1, when freshly made, is in equilibrium with 200 mg/l of Al expressed as $AlO_2^-$ in the solution at pH 4 and R.T., but after 18 hours the $AlO_2^-$ in the solution increases to more than 300 mg/l. On the other hand, a sol of Si/Al ratio of 6/1 when freshly made is in equilibrium with 15 mg/l of Al in the solution expressed as $AlO_2^+$ at pH 4 and R.T. and the equilibrium is maintained for at least 18 hours.

The aluminosilicate sols of this invention are made up of uniform particles of aluminosilicate having a uniformity such that the maximum standard deviation is 0.37d where d is the weight average particle diameter. The aforesaid sols are especially useful when the maximum standard deviation is 0.30d. The uniformity of the particles in the sols of this invention can also be expressed in a formed based on the number average of particles rather than weight average. The uniformity based on particle number average is a maximum standard deviation of 0.43d where d is the number average particle diameter.

The aluminosilicate sols of this invention may be modified with various metals defined herein by replacing some of the ammonium ions with metallic ions. The metal desired in the final powder may be introduced by replacing the ammonium ion in the aluminosilicate sol by addition of a soluble salt of the metal. In this case a salt is selected with an anion such as nitrate or formate that can be eliminated by heating the powder at relatively low temperature, or one that does not interfere with the use of the powder as a catalyst.

The metal desired in the final powder can also be introduced in the aluminosilicate sol in some cases by replacing the replaceable ammonium in the aluminosilicate sol using an ion exchange resin containing the desired metal ion prior to the drying step. The ion exchange step can be made by either the batch method or the column method.

Hydrogen can also be substituted for the replaceable ions by heating the ammonium aluminosilicate in the powder form to eliminate ammonia.

Some dilute sols with Si:Al ratios of 10:1 or more having sodium or potassium ions may be exchanged directly with hydrogen ions, providing the particles are not allowed to aggregate before drying.

Metal cations that may replace the sodium, potassium or ammonium in the aluminosilicate solution before drying may be Cs, Li, Rb, Mg, Ca, Sr, Ba, rare earth metals, transition metals, electron donor metals and Bi, Sn, Cd, and Sb.

What is meant by transition metals is Sc, Ti, V, Cr, Mn, Fe, Co, Ni, Y, Zr, Nb, Mo, Tc, Rn, Rh, Pd, Hf, Ta, W, Re, Os, Ir and Pt.

What is meant by rare earth metals is La, Ce, Pr, Nd, Pm, Sm, Eu, Gd, Tb, Dy, Ho, Er, Tm, Yb and Lu.

What is meant by electron donor metals is Cu, Ag and Au.

The preferred cations to replace the sodium or potassium of the aluminosilicate are $NH_4$, H, Ca, Mg, Mn, Ru, Rh, Pd, La, W, Re, Ir, Pt, Ce and mixed rare earth metals.

In all cases where metals are exchanged in the sol, conditions must be such as to avoid any aggregation or gelling of the sol particles.

Replaceable ions can also be replaced in the powder after drying by adding a metal soluble salt to a suspension of the powder in water and drying or separating the powder by filtration or centrifugation, washing and drying.

The final concentration of the aluminosilicate sol is limited by the final particle size of the sol. This is because the maximum concentration at which a sol is still stable with respect to gelation is a function of its particle size. Larger particle size sols can be concentrated to stable sols of higher concentrations than smaller particle size sols.

Table 1 illustrates the maximum stable concentration limits of aluminosilicate sol where the particles consist entirely of aluminosilicate:

| Particle Dia. (d) nanometer | Max Conc. Aluminosilicate, % by weight |
|---|---|
| 5 | 12 |
| 25 | 30 |
| 60 | 53 |

The maximum stable concentration, $c_m$ of intermediate particle sizes appears to follow the equation $$c_m = 5.1 d^{0.56}$$

where d is the diameter of the particles.

The heel concentration likewise is limited by the particle size of the sol but may vary generally from 0.2 to 55% by weight of the aluminosilicate or silica. The upper concentration level depends on the composition and particle diameter of the heel particles. Discrete silica particles are in general less solvated than aluminosilicate particles. Silica sols are stable toward gelation or flocculation at higher concentration than corresponding aluminosilicate sols of the same particle size. Thus, the upper limit of heel concentration is higher for silica than for aluminosilicate. However, as soon as deposition of aluminosilicate has started the sol of silica or other refractory oxide takes on the colloid characteristics of an aluminosilicate sol.

Low concentrations of heel sol are generally employed when the heel particles are very small or the build-up ratio is to be high. Concentrated heel sols are used only when the heel particles are large and only a low or moderate build-up ratio is anticipated. In any case, it is advantageous to start with as concentrated a heel sol as is practical so as to provide as much surface as possible for deposition of aluminosilicate and thus permit the coating process to operate at maximum allowable speed.

The particle size and particle size distribution of the colloidal particles of the aquasol can be determined by photomicroscopic counting techniques involving mircographs obtained with the electron microscope by transmission or scanning electron micrography. The electron micrographs show that the ultimate particles of the sol are essentially discrete or unaggregated. The micrograph is used to determine the particle size and particle size distribution of the colloidal particles of the aquasol by employing a photomicroscopic counting technique utilizing a Zeiss Particle Size Analyzer TGZ3 to assist in the counting. The technique is described in the literature as, for example, "Semiautomatic Particle Size Analysis", Ceramic Age, December, 1967, and "Applications of Photomicroscopic Technique to the Particle Analysis of a Sample from a Nuclear Cratering Cloud", by G. F. Rynders, IMS Proceedings, 313 (1969).

The following table illustrates results of particle size distribution determinations of homogeneous aluminosilicate aquasols of this invention obtained by electron micrograph counting techniques.

| | Particle Diameter, Nanometer | | | |
|---|---|---|---|---|
| | Weight Average | Standard Deviation | Number Average | Standard Deviation |
| Sol 1 | 7 | 2 | 6 | 2 |
| Sol 2 | 16 | 6 | 13 | 3 |
| Sol 3 | 18 | 3 | 16 | 3 |
| Sol 4 | 26 | 8 | 22 | 5 |
| Sol 5 | 38 | 5 | 36 | 5 |
| Sol 6 | 65 | 5 | 64 | 6 |

The sols prepared by the process of this invention may contain 3 to 70% solids depending on their composition and particle size. The sols are stable, that is their viscosity does not increase substantially when stored at room temperature (20° to 35° C.) over a ten-month period.

The amorphous aluminosilicate sols having uniform particle sizes, prepared by the process of this invention, are dried to achieve a powdered amorphous aluminosilicate with uniform pore size distribution. In order to attain the uniform pore size, the particles must pack themselves uniformly into a porous aggregate so that the final mass or aggregate is not bridged by particles leaving larger voids internally.

The sols of this invention consisting of uniform-sized particles have the characteristic that as water is removed and the percent solid increases, the viscosity does not change drastically until a certain rather narrow concentration range is reached, after which further increase in concentration causes a sharp increase in the viscosity of the sol. This particular concentration range depends to a large extent on the ultimate particle size of the sol. If the sol is concentrated up to this more or less critical concentration, W, so that it becomes viscous, it becomes unstable in the sense that the viscosity of the sol will then spontaneously increase with time even though no more water is removed. If this spontaneous increase in viscosity is permitted to occur, the sol is converted to a solid mass of hydrated gel containing all the water that was present in the sol. When a gel of this type is then broken up and further dried to a powder, it is found that the pore diameter in the dried gel is not uniform.

On the other hand, if the sol is rapidly and continuously concentrated beyond W by further rapid removal of water, the viscosity increases until the mass becomes rigid. When this is further dried it is found the pores are uniform.

Thus, if the sol has been concentrated to some point less than W, and then it is dried very rapidly as by spray drying, the water is removed and the ultimate particles move closely together to form a closely packed mass. In such a powder the pores between the particles are relatively uniform. In order for this to occur the water must be removed relatively quickly so that the particles do not have time to form the chain networks that occur during the gelling process.

Accordingly, drying must be sufficiently rapid that once the critical total solids concentration W is reached, water is removed fast enough to prevent bridging of the sol particles and consequently gelling. An example of too slow water removal is where the sol was allowed to stand at elevated temperature in a humid atmosphere. However, it is usually most economical to dry using processes where the sol is fed in drops or thin streams of liquid or "atomized" in a fine mist so that water is removed from the sol particles in a matter of seconds. If, however, freeze drying techniques are used, the sublimation or water removal can be extremely slow but still no gelling will occur. However, other forms of drying will result in gelling if sufficiently slow.

Once the sol has been prepared, it may be necessary to further concentrate it in order to minimize the amount of water that must be removed when it is dried from the sol to a gel powder. In some instances, this concentration may be so high that the sol is only temporarily stable, as evidenced by the fact that the viscosity increases with age due to the incipient formation of gel.

It is important that if the sol has to be concentrated to the point where experience shows that it is only temporarily stable, the sol should be dried at once before the viscosity has increased appreciably.

Examples of suitable drying processes include tray dryers, sheeting dryers, rotary dryers, spray dryers, through-circulation dryers, cylinder dryers, drum dryers, screw conveyor dryers, agitated pan dryers, freeze dryers, vacuum dryers, etc.

Adding alcohol or electrolytes to precipitate the aluminosilicate to separate by filtration or centrifugation the solid particles from the bulk of the water and drying the wet residue, will cause bridging of the particles, forming a precipitate, a coagulum or a gel with nonuniform pore size.

The preferred drying method is spray drying. Spray drying involves the "atomization" of the sol into a mist made of fine drops which dry almost instantaneously in contact with hot air. Spray drying produces a regular hollow, spheroidal, porous aggregate with a uniform pore size distribution where the average pore diameter as measured by nitrogen adsorption-desorption techniques is roughly half the diameter of the particles forming the closely packed, porous aggregate. The average diameter of the aggregates and the aggregate size distribution can be controlled by controlling the conditions of spray drying. For example, the type of atomizer used in spray drying influences the microspheroidal aggregate size distribution of the product. Rotating discs produce more uniform aggregate size distribution than pressure nozzles. In the case of two-fluid pressure nozzles or pneumatic atomization, the lower the concentration of the aquasol fed into the spray dryer, the higher the atomizing force (feed pressure in the spraying nozzle), and feed rate, and the lower the inlet drying temperature, the smaller the aggregate size.

When the sol is drum dried the aggregates tend to be irregularly shaped and the product shows a very broad aggregate size distribution. However, within the aggregates, the original aluminosilicate particles are very closely packed, and since they are spheroidal, the pores that they create within the assembly have a very uniform size distribution and the average size is approximately half the diameter of the uniformly sized particles constituting the assembly.

The powders having pore diameters between 45 Å and 250 Å with a uniformity such that at least 80% of the pore volume is made up of pores of from 0.6D to 1.4D, where D is the median pore diameter are also especially useful even though they are not as uniform as the powder with 20 Å to 150 Å pores.

To obtain such a close packing of particles and therefore such a uniform pore size distribution, the aquasol has to be dried without substantial gelling or coagulation.

When the particles are allowed to remain unaggregated until most of the water between the particles evaporates, the surface tension of the water film around the particles, and especially in crevices around points of contact between particles, creates a force equivalent to compressing the assembly particles at high pressure. As a consequence, each sol droplet forms an aggregate or more of closely packed spherical particles. In this case, the pores are fairly regular in shape throughout the aggregate, and the size of the pores is very uniform.

The composition of this invention can be characterized by their chemical analysis, X-ray analysis, specific surface area measurement, pore size and pore size distribution determination, appearance under the electron microscope by transmission electron microscopy (TEM) and scanning electron microscopy (SEM), aggregate size measurement with Coulter counter, surface acidity measurement by titration with adsorbed indicator in nonaqueous liquid phase, ion exchange capacity, infrared analysis, differential thermal analysis (DTA), thermogravimetric analysis (TGA) and measurement of bulk density.

The chemical composition of the powders of this invention can be determined by analytical techniques conventional in the art. Broadly, the powders comprise chemically combined silicon, aluminum, hydrogen, oxygen and a metal ion, and physically or chemically combined water.

Water associated with the aluminosilicate can be analyzed by infrared, DTA and TGA techniques conventional in the art.

Water can be in the form of physically adsorbed $H_2O$, chemisorbed $H_2O$ and OH structural groups. Chemisorbed $H_2O$ includes water of hydration of Na ions and H-bound water on the surface of the particles. Physically adsorbed $H_2O$ is released at atmospheric pressure at 100° C. and chemisorbed $H_2O$ between about 100° and 200° C. There is more than one kind of OH structural group. Most OH groups stay on the surface of the aluminosilicate particles only up to temperatures in the order of 600° to 700° C.

Thermogravimetric analysis of said compositions in the Na form shows a gradual weight loss up to about 800° C. and very little weight loss at higher temperatures. The total weight loss of the spray dried powders is about 20%.

The structure of said compositions is shown to be amorphous by X-ray diffraction analysis.

Specific surface area of the powders of this invention can be measured by the well known BET method involving nitrogen adsorption [Brunauer, S.; Emmet, P. H.; and Teller, E. J.; J. Am. Chem. Soc. 60, 309 (1938)] or by a nitrogen adsorption method involving continuous-flow equipment based on principles of gas phase chromatography [Nelson, F. M., and Eggertsen, F. T., Anal. Chem., 30, 1387 (1958)]. Results of surface area measurements and electron micrograph observation of the precursor sol and the resultant powder can be combined and show that the powders of this invention are constituted by closely packed dense spherical or spheroidal particles nonporous to nitrogen with a uniform particle diameter in the range of 3 to 90 nanometers forming porous aggregates with an aggregate size larger than 1 micron.

Specific surface area of the powders of this invention range between 30 and 750 m$^2$/g. Diameter of the nonporous spherical particles making up the aggregates can be calculated by the formula:

$$\text{Particle Diameter [nanometer]} = \frac{6000}{\text{Specific Surface Area[m}^2\text{/g]} \times \text{Density of the Particles[g/cc]}}$$

The density of the particles can be measured by techniques well known in the art. The density varies with the chemical composition (Si/Al ratio) of the particles.

The shape and size of the aggregates are estimated from electron micrographs taken by TEM or SEM. For aggregates smaller than 100 μm, it is convenient to use micrographs made by transmission electron microscopy or by scanning electron microscopy.

Micrographs of powders of this invention made by spray drying show hollow spheres ranging in diameter between 1 and 200 microns. The aggregate size and aggregate size distribution of these spheres is a function of the conditions used for spray drying and whether a rotary disk or a spraying nozzle is utilized. Aggregates obtained by drum drying are irregular in shape and have an irregular size in the micron range.

Aggregate size and aggregate size distribution can also be obtained by a well known technique using the Coulter counter ("Particle Size Measurement", T. Allen, 2nd Edition, Chapter 13, Chapman and Hall, London, 1975). The Coulter technique is a method of determining the number and size of particles or aggregates by suspending the powder in an electrolyte and causing the particles or aggregates to pass through a small orifice on either side of which is immersed an electrode. The changes in resistance as particles pass through the orifice generate voltage pulses whose amplitudes are proportional to the volumes of the particles. The pulses are amplified, sized and counted and from the derived data the size distribution of the suspended phase may be determined.

Pore volume, average and median pore diameter and pore size distribution can be calculated using data on nitrogen adsorption and desorption obtained on a Model 2100 D Orr Surface-Area Pore-Volume Analyzer. This instrument is available from Micromeritics Instrument Corporation of Norcross, Georgia.

Pore volume distribution analysis can be made based on the method proposed by B. F. Roberts, J. Colloid and Interface Science 23, 266 (1967). This method provides a consistent method of pore volume distribution analysis allowing to estimate the distribution of the pore volume and area of a porous material as a function of pore size. The limitations are very few. The range of pore diameters is 20 Å < pore diameter < 600 Å. Other limitation are common to all procedures which use the capillary condensation approach including the fact that the pore model may not be representative of the pore structure.

Results are computed using a PORDIS-PORPTL computer program which generates BET surface area calculation, nitrogen desorption isotherm, plots of pore volume distribution, surface area distribution using the assumed pore model (cylinders) and plot of cumulative percent of both the pore volume distribution and surface area distribution. Specific surface area is determined by the BET method. Average experimental pore diameter is calculated by the ratio pore volume at saturation to the BET surface area. A plot of the cumulative percent of the pore volume distribution permits median pore and maximum and minimum diameter of pores constituting 90% of the pore volume to be determined.

The especially useful powders within the scope of this invention as measured by the method mentioned above showed median pore diameters between 20 Å and 150 Å with at least 90% of the pores in the approximate range ±40% of the median pore size. Thus said pores are of such uniformity that at least 90% of the pore volume is made up of pores that are from 0.6D to 1.4D in diameter, where D is the median pore diameter.

The powders of this invention have a "tapped" bulk density of at least 0.5 gram per cubic centimeter. "Tapped" density is measured by placing a weighed quantity of sample in a graduated cylinder, and tapping the cylinder until the volume is essentially constant. If the bulk density is less than about 0.2 g/cc, it will be found that the powders are extremely difficult to compact uniformly, and will give catalyst pellets or compacts having internal strains and in which stratification of the solids will be present.

When the bulk density of the powder as dried is too low as it may be in the case of some drying techniques, the bulk density can be increased by pressing the powder at low pressures into a compact and breaking up the compact to screen it or to use it in the form of small granules or particles.

The amorphous aluminosilicate powders of this invention are effective catalysts. Their uniform pore openings permit them to discriminate on the basis of size and configuration of molecules in a system. For example, the narrow pore size distribution of the powders of this invention enable them to be more effective catalysts in petroleum refining and catalyst cracking processes by their improved selectivity. The narrow pore size distribution of the powder permits the selection of a pore size for the catalytic operations without the accompanying of widely varying selectivity based on wide pore size ranges. Thus, the powders of this invention give an optimum catalyst selectivity in cat cracking operations whereby the desired isomers are obtained through narrow control of the pore size.

The compositions of this invention are amorphous aluminosilicates. Crystalline aluminosilicate zeolites are known to possess among other properties catalytic activity. However, crystalline aluminosilicate zeolites are so highly active as catalysts that, when used in the pure state, commercial catalytic cracking units cannot easily control the reaction involved to give desirable results. The present trend in the petroleum industry with regard to such zeolites favors the use of Y-type synthetic faujasite crystalline zeolites of silica/alumina ratios of 4.5 to 5.5/1 because they are thermally and hydrothermally more stable than X-type synthetic faujasite crystalline zeolites of silica/alumina ratios of 2.5/1.

The powders of this invention can be used together with crystalline aluminosilicate zeolites. The uniform distribution of crystalline zeolites within said powders as a matrix substantially improves the performance of the zeolites in catalytic cracking by diluting the active zeolite and moderating its activity while taking advantage of the benefits of the powders of this invention. The amorphous aluminosilicates of this invention are specially suited for this purpose because (1) they provide a matrix catalytically active itself (instead of inactive), (2) they provide access of reactants to the zeolite crystals through pores of controlled size and controlled size distribution and therefore controlled selectivity (3) they are stable to the high temperature hydrothermal treatment received in commercial regenerators, and (4) they form aggregates or grains hard enough to survive interparticle and reactor wall collisions without excessive breakage or attrition. However, the use of amorphous aluminosilicates as a matrix and co-catalyst is not limited to one type of crystalline zeolite. The choice of crystalline zeolite to be incorporated in the amorphous aluminosilicate of this invention is based on the type of reaction involved and the type of reactor unit available.

Another advantage of the amorphous aluminosilicates as matrices or co-catalysts with crystalline zeolites is that preferred ions, as for example the mixed rare earth ions in the case of catalytic cracking catalysts, can be uniformly and intimately distributed in the matrix by ion exchange techniques described herein for the parent amorphous aluminosilicate aquasol or the powder obtained by drying the aquasol.

The crystalline aluminosilicate zeolites are well known in the art and described in detail, for example, in Donald W. Breck's book on "Zeolite Molecular Sieves", Wiley-Interscience, New York, 1974.

Compositions involving known crystalline aluminosilicate zeolites and the amorphous aluminosilicates of this invention can be made by using the mixing, compounding, etc., techniques disclosed in the art to make zeolite-amorphous aluminosilicate catalysts (see for example, "Preparation and Performance of Zeolite Cracking Catalysts", by J. J. Magee and J. J. Blazek, Chapter 11 of ACS Monograph 171, "Zeolite Chemistry and Catalysis", edited by J. A. Rabo, ACS, Wash. D.C. 1976) or by other techniques specially suited to the characteristic properties of our compositions. For example, one way of intimately and uniformly distributing crystalline aluminosilicate zeolite crystals in the amorphous aluminosilicate matrix is to disperse the zeolite crystals of microscopic size in the amorphous aluminosilicate aquasols of the present invention, followed by drying of the aqueous dispersion in the manner described herein.

The amount of crystalline aluminosilicate zeolite that is advantageously incorporated in the amorphous silicate powders of this invention generally is from 5 to 50% by weight. Thus, catalyst cracking compositions can consist of 5 to 50% by weight (preferably 10 to 25%) of crystalline aluminosilicate zeolites and 95 to 50% by weight (preferably 90 to 75%) of the amorphous aluminosilicates of this invention.

The following examples further illustrate the compositions of this invention and the methods for their preparation. In the examples that follow, all parts are by weight unless otherwise noted.

EXAMPLE 1

This is an example of the preparation of a hydrous amorphous aluminosilicate powder of the invention where a heel of silica sol is used to form the core of the particles making up the powders.

A heel solution was prepared in a reactor vessel fitted with stirrer paddles in the following manner: 2000 ml of water were heated to 50° C. and 20 ml of sodium silicate JM diluted to a concentration of 20 g $SiO_2$/100 ml were added. Sodium silicate JM is an aqueous solution of sodium silicate with a $SiO_2/Na_2O$ weight ratio of 3.25 and a concentration of 29.6 weight percent silica (41.9 g $SiO_2$/100 ml). Ten grams of cationic ion exchange resin, Amberlite IRC-84-S, in the $H^+$ form were then added and the pH of the solution dropped from 10.2 to 9. At this point a dilute sol (0.2 g $SiO_2$/100 ml) of extremely small silica particles is formed. Amberlite IRC-84-S is a weak-acid carboxylic methacrylate cation exchange resin available from Rohm & Haas Company of Philadelphia, Pa. This resin has a total exchange capacity of 3.5 meq/ml wet, an approximate pK value of 5.3 with respect to sodium in a 1 molar solution, an apparent wet density of 0.75 g/cc, an effective particle size of 0.38 to 0.46 mm and a pH range 4 to 14, maximum operating temperature for this resin is about 120° C.

To this heel two feed solutions were added simultaneously and separately with vigorous agitation of the heel. One solution was an aqueous solution of sodium silicate with a $SiO_2/Na_2O$ weight ratio 3.25, with a silica concentration of 20 g/100 ml and the other was an aqueous solution of sodium aluminate, with a concentration of $NaAlO_2$ of 5 g/100 ml. The sodium aluminate solution was prepared by dissolving 67.61 g of Nalco 680 grade sodium aluminate in enough 0.1N NaOH to make 1 liter of solution. Nalco 680 is the Nalco Chemical Company, Chicago, Illinois, trademark for a white granular sodium aluminate trihydrate. Maximum solubility of Nalco 680 at 22° C. is 80 parts in 100 parts of water. Nalco 680 has a $Na_2O/Al_2O_3$ molecular ratio of 1.12 to 1, $Al_2O_3$ content is 46%, and $Na_2O$ content 31.0%. This analysis corresponds to 73.95% $NaAlO_2$. The sodium silicate solution was prepared by mixing 1351 g of JM grade sodium silicate with enough tap water to make 2 liters of solution. The two feed solutions were fed through capillary tubes into the heel solution just above the stirrer paddles at a rate of 4.3 ml/min for the silicate and 5.9 ml/min for the aluminate. Throughout the run the pH of the heel was kept constant at pH 9.1±0.2 units by periodically adding measured amounts of the IRC-84-S ion exchange resin and temperature was kept constant at 50° C.±1° C. Measurement of pH was done continuously at room temperature with a glass electrode by circulating part of the heel through a cooler.

A total of 1265 ml of sodium silicate solution, 1650 ml of sodium aluminate solution and 610 g of resin were used. At the end of the addition, the product was filtered first through cloth and then through filter paper to separate the resin from the aquasol. The pH of the product was 9.0.

The resulting product was 3.9 liters of a stable sodium aluminosilicate sol having a pH of 8.9. Solids concentration was determined by evaporating a weighed sample to dryness and calcining to eliminate $H_2O$. The solids concentration was 8.1 per 100 ml. Chemical analysis of the resulting sol indicated that it contained 5.50 g $SiO_2$/100 ml, 1.45 g $AlO_2$/100 ml, and 0.47 g Na/100 ml. Thus the resulting product was an aluminosiliate sol having the approximate empirical formula of $NaAlO_2.3.75\ SiO_2.n\ H_2O$. An electron micrograph of the sol showed very small particles in the order of 5 nanometers diameter or less.

To determine the degree of aggregation which is an indication of the closeness to gelling, the percent hydrated colloid solids or percent S value was calculated from a measurement of viscosity in an Ostwald pipette and found to be 40. Calculation of percent S was made using the Mooney equation as described in J. Colloid Sci. 6, 162 (1951). The value of 40 indicates there is no extensive aggregation.

The sodium aluminosilicate sol was converted to the ammonium form by passing it through an ion exchange column packed with wet Dowex 50W-X8 ion exchange resin in the $NH_4^+$ form. Dowex 50W-X8 is the trademark of the Dow Chemical Co. for a strong-acid cation exchange resin of the sulfonated polystyrene-divinylbenzene polymer type. Dowex 50W-X8 has a total exchange capacity of 1.7 meq/ml wet resin. Mesh size of the wet resin is 20 to 50, density is 50 to 53 lb/ft$^3$ and moisture content as shipped by the manufacturer in the H$^+$ form is 53%. Effective pH range of Dowex 50W-X8 is 0 to 14, and the resin is stable up to 150° C. When the sol was thus treated, $NH_4^+$ ions replaced most of the $Na^+$ ions attached to $AlO_2^-$ sites and chemical analysis showed that only 0.017 g Na/100 ml (3% of the original Na content) remained in the aquasol.

The ammonium aluminosilicate thus formed had a pH of 9 and it was spray dried in a Bowen Engineering, Inc. No. 1 Ceramic Dryer using a two-fluid nozzle type 59-BS. Operating conditions for spray drying were the following:

| Feed Weight % solids: | 8 |
|---|---|
| Total feed | 200 ml |
| Feed rate: | 120–125 ml/min |
| Inlet temp.: | 300–310° C. |
| Outlet temp.: | 140–148° C. |
| Atomizing pressure: | 20 psig |

Powder samples were collected in the cyclone and chamber collectors. Total product collected was 128 g for 80% recovery on a wet basis.

Electron micrographs of the spray dried powder showed that it was constituted by spheroidal aggregates with an average diameter of about 15 microns.

Chemical analysis of the powder gave the following Si/Al ratio and $Al_2O_3$ content:

| Si/Al ratio | 3.75:1 |
|---|---|
| $Al_2O_3$ | 17% by weight. |

Surface area and pore volume, pore diameter and pore size distribution analysis of the spray dried powder were made by a nitrogen absorption-desorption method using a Micromeritics 2100-D apparatus. Micromeritics 2100-D is the trademark of Micromeritics Instrument Corporation of Norcross, Georgia, for an Orr Surface-Area Pore-Volume Analyzer.

Results were obtained as follows:

| Specific Surface Area | 590 m$^2$/g |
|---|---|
| Experimental average pore diameter | 22 Å |
| Pore volume | 0.330 ml/g |

Pore volume distribution analysis was made based on the B. F. Roberts method [J. Colloid and Interface Science 23, 266 (1967)] and the results computed and plotted using the PORDIS-PORTL computer program.

The arithmetic probability plot of the pore diameter versus pore volume data computed by the PORDIS program showed a median pore diameter of 28 Å. Ninety percent of the volume of the pores was constituted of pores ranging in diameter from the smallest measurable by the method (20 Å) up to 39.5 Å (41% above the median pore diameter). Seventy percent of the volume of the pores was constituted of pores ranging in diameter from 20 Å, the smallest measurable by the method, up to 32.5 Å (16% above the median pore diameter).

EXAMPLE 2

The usefulness of the product of this invention in catalyst cracking of petroleum is illustrated by this example.

Using the procedures well known in the art, 200 parts of the dried product obtained above is intimately mixed with 800 parts of an acid-activated halloysite clay, blending in sufficient water to produce a thin paste. The paste is prepared to the consistency required for extrusion and is converted by extrusion to $\frac{1}{8}'' \times \frac{1}{8}''$ cylinders. It should be noted that if a more abrasion resistant material is required, the product can be pilled on a typical pharmaceutical pilling machine to obtain harder and much stronger material than that obtained by extrusion.

After forming into the cylinders, the catalyst is impregnated with 0.5% Pd by ion exchange from an aqueous solution of palladium tetraamine chloride. The dried catalyst is then reduced and charged to a typical small scale hydrocracking test unit where the following conditions pertained and results obtained.

| Charge: | Catalytically cracked gas oil | |
|---|---|---|
| | Temperature | 650° F. |
| | Pressure, psig | 1600 |
| | Liquid space velocity | 2.50 |
| | H$_2$/oil ratio scf/barrel | 8000 |
| Product: | Jet Fuel | |
| | Weight percent based on feed | 65.2 |
| | Specific gravity | 0.802 |
| | Sulfur content ppm | 950.0 |
| | Freezing point | −76° F. |
| | H$_2$ consumption scf/bbl | 2050.0 |

EXAMPLE 3

This was an example of the preparation of a hydrous amorphous aluminosilicate powder of the invention where a heel of silica sol prepared in situ was used in the apparatus described in Example 1 to form the core of the particles of this invention.

A 1% silica sol heel was prepared in situ at 70° C. and pH of 9 by diluting 160 ml of 20% $SiO_2$ sodium silicate JM ($SiO_2/Na_2O$ weight ratio 3.25) to a total volume of 3000 ml with hot tap water to make 3 liters of 1.06% $SiO_2$ heel (32 g $SiO_2$ in 3000 ml of solution). The heel was heated to 70° C. and then deionized to pH 9±0.1 with 80 g of ion exchange resin Amberlite IRC-84-S. A sample of the solution was extracted at this point to measure specific surface area of the silica thus formed. Specific surface area of the silica as measured by the titration method of G. W. Sears in Anal. Chem. 28, 1981 (1961) was 675 m$^2$/g. Assuming that the silica is in the form of spherical particles of amorphous $SiO_2$ of density 2.2 g/cc the average particle diameter of the silica calculated on the basis of the specific surface area value obtained is 4 nanometers. Feed solutions were added in the manner explained in Example 1 to build-up with sodium silicate and sodium aluminate, each at a rate of 12 ml/min while simultaneously heating the heel to 100°

C. Heating from 70° C. to 100° C. took about 30 minutes. The two feed solutions of Example 1, aqueous sodium silicate solution 20 g $SiO_2$/100 ml and aqueous sodium aluminate solution 5 g $NaAlO_2$/100 ml were used. In 10 minutes the pH of the heel rose to 10.3 due to the alkalinity of the feed solutions being added. From this point on the heel was kept at 10.4±0.1 by periodic additions of IRC-84-S resin.

A total of 3958 ml of sodium silicate solution, 3950 ml of sodium aluminate solution and 1440 g of resin were used. At the end of the addition the hot colloidal solution obtained was filtered first through cloth and then through filter paper to separate the ion exchange resin from the aquasol.

The resulting product was 9050 ml of a stable sodium aluminosilicate sol of pH 10.7 containing 10.72 g/100 ml solution. Solids concentration was determined as disclosed in Example 1. Chemical analysis of the resulting sol indicated that it contained 10.4 g $SiO_2$/100 ml, 1.44 g $AlO_2$/100 ml and 0.854 g Na/100 ml. Thus the resulting product was an aluminosilicate sol having the empirical formula $NaAlO_2 \cdot 7SiO_2 \cdot nH_2O$. The specific surface area of the sol was determined after the sol was dried by measuring the surface area by nitrogen adsorption using the flow method. Specific surface area thus measured was 135 $m^2$/g.

An electron micrograph of the sol showed discrete spheres of uniform diameter. Weight average diameter was 18 nanometers and number average diameter was 16 nanometers. The standard deviation in both cases was 3 nanometers.

The sol was converted to the ammonium form by ion exchange in the manner described in Example 1.

The ammonium aluminosilicate thus formed was dried in vacuum in a Hoffman drum dryer at 100° C. A Buflovak laboratory size vacuum double drum dryer manufactured by the Buffalo Foundry & Machine Co. was used. It had two 18×18 Type 304 stainless steel drums, 6" diameter×8" face, designed for 150° C. steam or 100° C. water. The casing was designed for full vacuum and provided with doors for access into the drums. Drum spacing was adjustable from the outside shell. The sol was allowed to drip into the cavity formed by the two hot rotating metal cylinders. The cylinders were under vacuum and heated internally with steam at 100° C., therefore a very fast rate of evaporation was achieved. The dried material was scraped with a Type 410 hardened chrome steel cutting knife. Drying conditions were as follows:

| Steam Temperature | 100–103° C. |
|---|---|
| Vacuum | 8–15 mm |
| Drum Speed | 7 rpm |

The drum dried powder was analyzed for specific surface area, pore volume, pore diameter and pore size distribution as in Example 1. The results obtained were as follows:

| Specific surface area | $m^2$/g |
|---|---|
| Experimental average pore diameter | 40 Å |
| Pore volume | 0.256 ml/g |

The data showed a median pore diameter of 43 Å. The upper (52.1 Å) and lower (27.9 Å) limits for 90% of the pore volume were within the median pore diameter.

Chemical analysis of the powder showed that Si/Al ratio was 3.75 and $Al_2O_3$ content 18% by weight.

EXAMPLE 4

The usefulness of the product of the invention for Fluid Catalytic Cracking Operations (FCC) could be illustrated by the example.

Using the procedures well known in the art, 200 parts of the dried product obtained above is intimately mixed with 800 parts of an acid-activated halloysite clay, blending in sufficient water to produce a thin paste. The paste is prepared to the consistency required for spray drying, and then the spray drying operation is performed, and a microspheroidal product is obtained.

The catalyst thus obtained is evaluated in a typical bench scale fluid catalytic cracking converter equipped so that the catalyst can be treated before test with steam at 1100° F. and 20 psig for 10 hours. Thereafter, the fluidized catalyst is treated with $H_2S$ for 2 hours also at 1100° F. but at only 10 psig.

A feed of Lybian gas oil of 650° to 1120° F. boiling range is processed at temperatures of 880° to 1020° F. to produce the following products at the low, mid-point and top of the reactor temperature ranges.

| Products, Liquid Volume Percent | High Gasoline Condition | High Middle Distillate | High $C_3$ to $C_4$ |
|---|---|---|---|
| Gas (Wt. percent) | 2.1 | 1.2 | 3.1 |
| Propane | 2.2 | 0.9 | 3.1 |
| Propene | 8.3 | 4.2 | 14.6 |
| Isobutane | 8.1 | 4.4 | 14.0 |
| N-Butane | 1.4 | 0.8 | 3.2 |
| Butenes | 11.6 | 5.5 | 16.7 |
| DB Naphtha | 71.1 | 46.5 | 56.3 |
| LCGO | 7.1 | 38.5 | 8.0 |
| HCGO | 3.0 | 3.0 | 3.0 |
| Coke (Wt. percent) | 6.0 | 6.2 | 7.9 |

The catalyst can be shown to be equally directive with other feed types and other operating conditions. The catalyst can be used without the clay matrix or it can be mixed with other clays or binders as economically preferable. The proportion of clay to catalyst can be varied also to achieve the optimum.

The liquid space velocity can be varied from the 2.0 employed above to as low as 0.5 or as high as 6.5 with appropriate modifications in the operating temperature and conditions.

The used catalyst becomes deactivated by coke (carbon) deposition, but it is readily regenerable by controlled oxidation of the deposit with a controlled atmosphere of low percentages of oxygen in steam or in nitrogen. Because of the uniform pores of the product of the invention, regeneration is more uniformly and completely possible. Consequently the catalyst is regenerated essentially to its original selectivity and activity.

Further modifications of the catalyst may be accomplished by utilizing the ion exchange properties of the product of the invention. Manganese, magnesium, rare earths, especially lanthanum, and mixed rare earths are introduced into the structure in place of alkali by ion exchange.

The catalyst of the invention can be modified (promoted) with one or more metals to derive a catalyst useful for catalytic reforming. The spray dried product derived in the first paragraph of the description of the preparation of the FCC (fluid cracking catalyst) is further treated by methods known in the art so as to impregnate or ion exchange the catalyst with platinum, for example, as platinum amine chloride. The treatment is effected in such a way as to attain a 0.5% platinum content. The platinum-containing catalyst is dried and reduced in a hydrogen atmosphere at 200° C. (392° F.). The reduced catalyst is then coated with sufficient perrhenic acid solution to attain a level of 0.3% Re in and on the catalyst. To reduce the salts to the metallic form, the salt-impregnated catalyst is heated to 250° to 300° C. in a hydrogen flow. The metals in and on the catalyst now comprise 0.5% Pt and 0.3% Re in reduced form. The catalyst at this point is suitable for use in the reforming operation and is evaluated in equipment well known in the art as follows:

| Feedstock | | | |
|---|---|---|---|
| Boiling range | 215° to 370° F. | | |
| Composition | | | |
| Paraffins | 51% | | |
| Naphthenes | 34% | | |
| Aromatics | 15% | | |
| Pressure of Operation | 350 psig | 250 psig | 150 psig |
| Products: | | | |
| $H_2$ wt percent | 2.1 | 2.4 | 2.7 |
| $C_1$ wt percent | 1.2 | 1.0 | 0.8 |
| $C_2$ wt percent | 2.5 | 2.1 | 1.5 |
| $C_3$ wt percent | 4.7 | 3.8 | 2.9 |
| $iC_4$ vol percent | 3.0 | 2.4 | 1.9 |
| $nC_4$ vol percent | 4.3 | 3.4 | 2.6 |
| $C_5$ EP vol percent | 77.8 | 81.0 | 83.5 |
| $C_5$ EP wt percent | 83.5 | 87.0 | 88.5 |

The used catalyst can be regenerated by removal of coke and the activity is restored to that of fresh catalyst. The use and regeneration can be repeated with the same results of high activity and selectivity because of the high thermal stability of the catalyst of the invention. Space velocities that the catalyst will effectively permit are in the range 0.5 to 4.6 liquid/vol cat/hour.

EXAMPLE 5

This was an example of the preparation of a hydrous amorphous aluminosilicate powder of the invention where a heel of sodium aluminosilicate was used as the core for the particles making up the powder.

A heel was made by diluting 1166 ml of the aquasol product of Example 3 (specific surface area 135 m$^2$/g) in the Na form (pH 10.4) containing 10.72% solids, with hot water to complete a total volume of 3 liters. Thus the heel was 4.16% solids and contained 125 g of sodium aluminosilicate. The heel was heated to 100° C. and the pH was measured (pH 10). When the heel reached 100° C., the feed solutions of Example 1 were added each at a rate of 12 ml/min in the manner described in Example 1 while keeping the temperature of the heel at 100° C.±1° C. and the pH at 10.4±0.1. The pH was kept constant by periodically adding IRC-84-S ion exchange resin. A total of 3980 ml of each of the feed solutions and 1360 g of resin were used. The build-up ratio (BR) for this first build-up step was therefore 8.96. Build-up ratio is calculated by dividing the total amount of solids in the feed solutions added during the process by the amount of solids present in the heel before starting the addition.

The build-up ratio calculated above and the $S_i$ (specific surface area initially) determined independently by measurement were used to calculate the final specific surface area ($S_F$) with the following formula:

$$S_F = S_i \sqrt[3]{\frac{1}{BR}} = 135 \sqrt[3]{\frac{1}{8.96}} = 65 \text{ m}^2/\text{g}$$

Using the formula d=6000/D×S
  where d is the diameter of the particles in nanometers
  where D is the density of the particles g/cc
  where S is the specific surface area in m$^2$/g of the particles.
The diameter of the final particles was calculated as follows:

$$d = \frac{6000}{2.2 \times 65} = 42 \text{ nanometers.}$$

At the end of the addition the slurry was filtered first through cloth and then through filter paper to separate the ion exchange resin from the aquasol.

The volume of the product recovered was 9700 ml. The concentration was 11.76 g solids per 100 ml. This concentration was determined by evaporating a weighed sample to dryness, calcining the residue and reweighing.

Chemical analysis of the sol gave the following results: 10.5 g SiO$_2$/100 ml, 1.64 g AlO$_2$/100 ml and 0.854 g Na/100 ml. A sample was dried on steam and the specific surface area as measured by the Flow Method of nitrogen adsorption was 70 m$^2$/g. An electron micrograph of the sol showed discrete, dense spherical particles with a uniform particle size distribution, a weight average diameter of 38 nanometers and a number average diameter of 36 nanometers. Standard deviation in both cases was 5 nanometers.

Because of limitations in the size of the vessel and the feed concentration, the above particle build up was continued in a second step. Based on an initial surface area of 70 m$^2$/g, it was calculated that a build-up ratio (BR) of about 5 would be needed to attain a specific surface area of about 40 m$^2$/g. The particle size calculated from $S_F$=40 was 65 nanometers.

A heel for the second step of the build up was prepared by diluting 850 ml of the sol of concentration 11.76 g solids/100 ml just described with hot tap water to a total volume of 5 liters. The heel was therefore 2% solids and contained a total of 100 g of sodium aluminosilicate.

The heel was heated to 100° C. and feed solutions were added each at a rate of 6 ml/min while keeping the pH constant at 10.3±0.2 with the periodic addition of ion exchange resin IRC-84-S. The two feed solutions were the same used in the first build-up step, aqueous silicate solution 20 g SiO$_2$/100 ml and aqueous aluminate solution 5 g NaAlO$_2$/100 ml.

A total of 1640 ml of each of the feed solutions and 560 g of ion exchange resin were used. At the end of the addition, the slurry was filtered first through cloth and then through filter paper to separate the ion exchange resin from the aquasol.

The volume of the product recovered was 7600 ml. Analysis of the product gave the following results:
  Concentration=6.96 g solids/100 ml
  SiO$_2$=5.31 g/100 ml
  AlO$_2$=0.87 g/100 ml
  Na=0.466 g/100 ml
  Specific surface Area=46 m$^2$/g.

An electron micrograph of the sol showed discrete, dense spherical particles with a uniform particle size distribution, a weight average diameter of 65 nanometers (standard deviation=5 nanometers) and a number average diameter of 64 nanometers (standard deviation=6 nanometers).

The sodium aluminosilicate aquasol was converted to the ammonium form by passing it through an ion exchange column packed with wet Dowex 50W-X8 ion exchange resin in the $NH_4^+$ form. pH of the $NH_4^+$ sol thus formed was 9.5.

The sol was vacuum drum dried under the same conditions given in Example 2 and the dry power obtained was analyzed for pore size distribution and pore volume by nitrogen adsorption-desorption as described in Example 1. The results obtained are as follows:

Experimental average pore diameter = 150 Å
Pore Volume = 0.306 ml/g.

The powder had a narrow pore size distribution: both the upper (229 Å) and the lower limit (110 Å) of pore size for 90% of the pore volume were within 40% of the median pore diameter (180 Å).

EXAMPLE 6

The powder of Example 5 was tested for its ability to catalyze the synthesis of methylamines. A continuous flow reactor was used in which $NH_3$ and methanol were pumped continuously through a 1" tube containing 50 g of powder. Feed rate used for liquid methanol was 1.50 cc/min, feed rate for ammonia gas, 1100 cc/min. The tube was kept at a constant temperature of 450° C. and at a constant pressure of 1 atm. The exit and inlet streams of the tube were analyzed with a gas chromatograph and the yields of methylamines and the conversion of methanol determined.

The operation was repeated using commercial Davison silica-alumina gel Grade 970, a trademark of the Davison Chemical Division of W. R. Grace & Co., with about the same alumina content of our sample. The results obtained with both catalysts are as follows:

|  | Composition of this Invention | Davison's Grade 970 |
|---|---|---|
| Methanol conversion, percent | 97 | 90 |
| Dimethylamine yield* | 12 | 8 |
| Monomethylamine yield | 14 | 11 |
| Trimethylamine yield | 20 | 19 |

*Moles of DMA over moles of methanol converted

Thus, the results show that a composition of this invention gave higher methanol conversion, higher desirable monomethylamine production and more favorable product distribution than standard commercial silica-alumina gel.

EXAMPLE 7

This was an example of the preparation of an amorphous aluminosilicate powder of the invention using a freshly prepared sol of silicic acid and a solution of sodium aluminate as reactants and a heel of water.

A heel of 1.5 liters of water was heated to reflux at 100° C. To this heel, simultaneously and separately, was added (a) 1200 ml of 2% silicic acid solution prepared from "F" grade sodium silicate, which contained 28.6% $SiO_2$ content, then passed through a column of Dowex 50W-X8 cation exchange resin in the hydrogen form, the resulting silicic acid effluent contained 2% $SiO_2$ and had a pH of about 3.2 and (b) 1200 ml of a sodium aluminate solution (2.7 g $NaAlO_2$ per 100 ml) prepared by dissolving 42 g of $NaAlO_2$ (74% reagent) in water and diluting to volume. The rate of addition of each was 200 ml per hour. During the addition of the two feed solutions, the temperature was maintained at 100° C. and the pH at 11.3±0.2 by adding IRC-84-S ion exchange resin. The resulting sol was cooled, deionized with Amberlite IRC-84-S in the hydrogen form by stirring this resin with the sol until the pH reached 7.6.

The resulting 3800 ml of product was a stable sodium aluminosilicate sol containing 1.08 g solids per 100 ml. Chemical analysis of the resulting sol indicated that it contained 0.47 g $SiO_2$/100 ml, 0.39 g $AlO_2$/100 ml and 0.24 g Na/100 ml. Thus, the resulting product was an aluminosilicate sol having the empirical formula $NaAlO_2.SiO_2$. An electron micrograph of the sol showed discrete spheres of uniform diameter. The weight average diameter is 13 nanometers (standard deviation 4 nanometers) and the number average diameter is 11 nanometers (standard deviation 3 nanometers).

The sol was converted to the ammonium form and spray dried in the manner described in Example 1. The powder obtained was analyzed as in Example 1.

The results obtained were as follows:
Specific surface area: 280 m$^2$/g
Experimental average pore diameter: 57 Å
Pore volume: 0.3995 ml/g.

Median pore diameter was 51 Å. Ninety percent of the volume of the pores was constituted of pores ranging in diameter from 32 Å to 68 Å (within ±40% of the median pore diameter).

EXAMPLE 8

The usefulness of the product of Example 7 for the isomerization operation is shown by this example.

The procedure of Example 4 is followed with the product of Example 7, except that a paste is made to a consistency for extrusion. The paste is extruded into $\frac{1}{8}"\times\frac{1}{8}"$ cylinders. The cylinders are impregnated with promoters, 0.5% Pt and 0.2% Re and the impregnated catalyst is reduced to form the respective metals. The catalyst is then given a typical isomerization test in small scale equipment as follows:

Charge: Pentanes and Hexanes—HDS treated.

| Conditions: | | |
|---|---|---|
| Temperature | 300° to 400° F. | |
| Pressure | 300 psig | |
| Space velocity | 3.0 LVH | |
| H$_2$ to oil, mole ratio | 0.1 to 0.5:1 | |
| Components, wt percent | Feed | Product |
| C$_4$ and lighter | 0.2 | 1.0 |
| Isopentane | 24.8 | 39.9 |
| n-Pentane | 21.4 | 10.8 |
| 2,2-dimethylbutane | 1.0 | 16.3 |
| 2,3-dimethylbutane | 2.9 | 4.5 |
| Cyclopentane | 1.5 | 1.1 |
| 2-methylpentane | 14.0 | 12.5 |
| 3-methylpentane | 12.3 | 6.9 |
| n-Hexane | 13.1 | 4.2 |
| Benzene | 1.6 | — |
| Methyl cyclopentane | 1.8 | 1.3 |
| Cyclohexane | 0.0 | 1.0 |
| Research Octane No. | 72.0 | 85.0 |

The catalyst shows excellent stability and continued selectivity.

EXAMPLE 9

This is an example of the preparation of an amorphous aluminosilicate powder of this invention with silica as the particle nucleus or core.

Three thousand grams of a 50% by weight, 60 nanometers particle size silica sol heel is heated to 100° C. and the pH is adjusted to 10.3 with sodium hydroxide. The silica sol used is commercially available under the trade name of Nalcoag 1060 from the Nalco Chemical Company of Oak Brook, Illinois. Feed solutions and ion exchange resin are added in the manner described in Example 1 and sodium silicate and sodium aluminate, each added at a rate of 6 ml/min while keeping the heel at 100° C. The two feed solutions of Example 1, aqueous sodium silicate solution 20 g $SiO_2$/100 ml and aqueous sodium aluminate solution 5 g $NaAlO_2$/100 ml, are used. The heel is kept at pH 10.3±0.1 by periodic additions of IRC-84-S resin.

A total of 340 ml of sodium silicate solution, 340 ml of sodium aluminate solution and 117 g of resin are used. At the end of the addition, the hot colloidal solution obtained is filtered first through cloth and then through filter paper to separate the ion exchange resin from the aquasol.

The resulting product is 3010 ml of a stable sol made of silica particles coated with sodium aluminosilicate, of pH 10.7 containing 43 g of solids per 100 ml solution. Solids concentration is determined as explained in Example 1. Dry powder is obtained by drying the sol. The surface area of the powder is measured by nitrogen adsorption using the flow method. The specific surface area thus measured is 40 $m^2$/mg.

An electron micrograph of the sol shows discrete spheres of uniform diameter. Average diameter is about 65 nanometers.

The sol obtained is converted to the ammonium form by passing it through an ion exchange column packed with wet Dowex 50W-X8 ion exchange resin in the $NH_4^+$ form as explained in Example 1. The aquasol in the ammonium form thus formed is spray dried as described in Example 1 using the same spray drying conditions. Powder samples are collected in the cyclone and chamber collectors. Total product collected is 1035 g.

Electron micrographs of the spray dried powder showed spheroidal aggregates with an average diameter of about 21 microns.

Surface area and pore volume, pore diamater and pore size distribution analysis of the spray dried powder are made by the nitrogen absorption-desorption method used in Example 1.

Results obtained were as follows:
Specific Surface Area 40 $m^2$/g
Experimental Average Pore Diameter 155 Å.

The arithmetic probability plot of the pore diameter versus pore volume data computed by the PORDIS program shows a median pore diameter of 150 Å. Ninety percent of the volume of the pores is constituted of pores ranging in diameter from 108 Å to 202 Å. Only 5% of the pores are larger than 202 Å. This pore fraction is smaller than 280 Å.

EXAMPLE 10

This is an example of the preparation of an amorphous aluminosilicate catalyst of the invention with a zirconia heel as the particle nucleus.

One thousand grams of 10% weight, 25 nanometers particle size zirconia aquasol is used as a heel. The sol is made of spherical particles with a uniform particle size distribution. The pH of the sol is 3.5. One hundred milliliters of a sodium citrate solution containing 2.8 g of sodium citrate are added to the sol at a rate of about 12 ml/min with strong agitation. The resulting sol is 2.8 g of sodium citrate/100 g $ZrO_2$. The pH of the sol is raised to 10.3 with NaOH.

The two feed solutions of Example 1, aqueous sodium silicate solution 20 g $SiO_2$/100 ml and aqueous sodium aluminate solution 5 g $NaAlO_2$/100 ml and ion exchange resins are added as described in Example 1 at a rate of 4.3 ml/min for the silicate and 5.9 ml/min for the aluminate while keeping the heel at 100° C. The heel is kept at pH 10.3±0.1 by periodic additions of IRC-84-S resin.

A total of 205 ml of sodium silicate solution, 286 ml of sodium aluminate solution and 70 g of resin are used. At the end of the addition the hot colloidal solution obtained is filtered first through cloth and then through filter paper to separate the ion exchange resin from the aquasol.

The resulting product is 1010 ml of stable sol made of zirconia particles coated with sodium aluminosilicate, of pH 10.7 containing 11.5 g solids/100 ml solution. Solids concentration is determined as explained in Example 1.

A sample of this sol is dried and the dry powder obtained is used for measurement of surface area by nitrogen adsorption using the flow method. Specific surface area thus measured is 37 $m^2$/g. An electron micrograph of the sol shows discrete spheres of uniform diameter. Average diameter is about 30 nanometers.

The sol obtained is converted to the ammonium form by passing it through an ion exchange column packed with wet Dowex 50W-X8 ion exchange resin in the $NH_4^+$ form as described in Example 1. The aquasol in the ammonium form thus formed is spray dried as described in Example 1 using the same spray drying conditions. Powder samples are collected in the cyclone and chamber collectors. Total product collected is 81 g.

Electron micrographs of the spray dried powder showed spheroidal aggregates with an average diameter of about 10 micrometers.

Surface area and pore volume, pore diameter and pore size distribution analysis of the spray dried powder are made by the nitrogen absorption-desorption method of Example 1.

The specific surface area is 35 $m^2$/g and the experimental average pore diameter is 120 Å.

The arithmetic probability plot of the pore diameter versus pore volume data computed by the PORDIS program shows a median pore diameter of 110 Å. Ninety percent of the volume of the pores is constituted of pores ranging in diameter from 77 Å to 143 Å. Only 5% of the pores are larger than 143 Å. This pore fraction is smaller than 210 Å.

EXAMPLE 11

This is an example of the preparation of an amorphous aluminosilicate catalyst of this invention with an eta alumina heel as the particle nucleus.

One thousand grams of 10% weight, 50 nanometer particle size eta alumina aquasol is used as a heel. The sol is made of spherical particles with a uniform particle size distribution. The pH of the sol is 3.5. One hundred milliliters of a sodium citrate solution containing 5 g of sodium citrate are added to the sol at a rate of about 12 ml/min with strong agitation to yield a sol with 0.55 g sodium citrate/100 g Al$_2$O$_3$. The pH of the sol is raised to 10.3 with NaOH.

The two feed solutions of Example 1, aqueous sodium silicate solution 20 g SiO$_2$/100 ml and aqueous sodium aluminate solution 5 g NaAlO$_2$/100 ml and ion exchange resins are added as described in Example 1 at a rate of 4.3 ml/min for the silicate and 5.9 ml/min for the aluminate while keeping the heel at 100° C. The heel is kept at pH 10.3±0.1 by periodic additions of IRC-84-S resin.

A total of 97 ml of sodium silicate solution, 133 ml of sodium aluminate solution and 50 g of resin are used. At the end of the addition, the hot colloidal solution obtained is filtered first through cloth and then through filter paper to separate the ion exchange resin from the aquasol.

The resulting product is 950 ml of stable sol made of alumina particles coated with sodium aluminosilicate, of pH 10.7 containing 9.9 g solids/100 ml solution. Solids concentration is determined as in Example 1.

A sample of this sol is dried and the dry powder obtained is used for measurement of surface area by nitrogen adsorption using the flow method. Specific surface area thus measured is 34 m$^2$/g. An electron micrograph of the sol shows discrete spheres of uniform diameter. Average diameter is about 55 nanometers.

The sol obtained is converted to the ammonium form by passing it through an ion exchange column packed with wet Dowex 50W-X8 ion exchange resin in the NH$_4$$^+$ form as in Example 1.

The aquasol in the ammonium form thus formed is spray dried as described in Example 1 using the same spray drying conditions. Powder samples are collected in the cyclone and chamber collectors. Total product collected is 76 g. Electron micrographs of the spray dried powder showed spheroidal aggregates with an average diameter of about 11 micrometers.

Surface area and pore volume, pore diameter and pore size distribution analysis of the spray dried powder are made by the nitrogen absorption-desorption method used in Example 1.

The specific surface area was 30 m$^2$/g and the experimental average pore diameter was 130 Å.

The arithmetic probability plot of the pore diameter versus pore volume data computed by the PORDIS program shows a median pore diameter of 145 Å. Ninety percent of the volume of the pores is constituted of pores ranging in diameter from 102 Å to 189 Å. Only 5% of the pores are larger than 189 Å. This pore fraction is smaller than 260 Å.

EXAMPLE 12

This is an example of the preparation of an amorphous aluminosilicate catalyst of the invention with a titania heel as the particle nucleus.

One thousand grams of 10% weight, 10 nanometers particle size titania aquasol is used as a heel. The sol is made of shperical particles with a uniform particle size distribution. The pH of the sol is 3.5. One hundred milliliters of a sodium citrate solution containing 135 g of sodium citrate are added to the sol at a rate of about 12ml/min with strong agitation to yield a sol with 13.5 g sodium citrate/100 g TiO$_2$. The pH of the sol is raised to 10.3 with NaOH.

The two feed solutions of Example 1, aqueous sodium silicate solution 20 g SiO$_2$/100 ml and aqueous sodium aluminate solution 5 g NaAlO$_2$/100 ml and ion exchange resins are added as described in Example 1 at a rate of 4.3 ml/min for the silicate and 5.9 ml/min for the aluminate while keeping the heel at 100° C. The heel is kept at pH 10.3±0.1 by periodic additions of IRC-84-S.

A total of 641 ml of sodium silicate solution, 894 ml of sodium aluminate solution and 220 g of resin are used. At the end of the addition, the hot colloidal solution obtained is filtered first through cloth and then through filter paper to separate the ion exchange resin from the aquasol.

The resulting product is 1980 ml of stable sol made of titania particles coated with sodium aluminosilicate, of pH 10.7 containing 10.5 g solids/100 ml solution. Solids concentration is determined as in Example 1.

A sample of this sol is dried and the dry powder obtained is used for measurement of surface area by nitrogen adsorption using the Flow Method. Specific surface area thus measured is 94 m$^2$/g. An electron micrograph of the sol shows discrete spheres of uniform diameter. Average diameter is about 15 nanometers.

The sol obtained is converted to the ammonium form by passing it through an ion exchange column packed with wet Dowex 50W-X8 ion exchange resin in the NH$_4$$^+$ form as described in Example 1. The aquasol in the ammonium form thus formed is spray dried as described in Example 1 using the same spray drying conditions. Powder samples are collected in the cyclone and chamber collectors. Total product collected is 165 g.

Electron micrographs of the spray dried powder showed spheroidal aggregates with an average diameter of about 8 micrometers.

Surface area and pore volume, pore diameter and pore size distribution analysis of the spray dried powder are made by the nitrogen absorption-desorption method used in Example 1.

The specific surface area was 95 m$^2$/g and the experimental average pore diameter was 75 Å.

The arithmetic probability plot of the pore diameter versus pore volume data computed by the PORDIS program shows a median pore diameter of 70 Å. Ninety percent of the volume of the pores is constituted of pores ranging in diameter from 49 Å to 91 Å. Only 5% of the pores are larger than 91 Å. This pore fraction is smaller than 170 Å.

Thus, the porous powder compositions of this invention may be used for the hydrocracking of petroleum distillates by contacting said compositions with said distillates, under conditions well known in the art.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as set forth in the claims.

What is claimed is:

1. A stable aluminosilicate aquasol having uniform size particles ranging from 3 to 90 nanometers in diameter with a molar ratio of Si:Al of 1:1 to 19:1, said uniformity defined by particles having a maximum standard deviation of 0.37d where d is the weight average particle size diameter.

2. The sol of claim 1 wherein the maximum standard deviation is 0.30d.

3. A stable amorphous aluminosilicate sol having uniform size particles prepared by the process comprising (a) preparing a heel sol of discrete colloidal particles selected from the group consisting of sodium, potassium or ammonium aluminosilicate, silica, and one or more refractory oxides selected from the group consisting of alumina, zirconia, lanthana, thoria, titania and rare earth oxides, said particles having a substantially uniform diameter within the range of 2 to about 85 nanometers, said aluminosilicate having a molar ratio of Si:Al of from 1:1 to 19:1, the initial concentration in the heel sol of sodium, potassium, ammonium aluminosilicate or refractory metal oxide being at least 0.2% by weight, with the particles stabilized against aggregation in the pH range 9 to 12;

(b) adding to said heel, separately but simultaneously, two feed solutions, one being a solution of sodium or potassium silicate having from one to 36 grams of silica per 100 cc, or a sol of silicic acid containing from 1 to 12% silica, the other being a solution of sodium or potassium aluminate containing from 1 to 15% alumina, said feed solutions being added in relative rates and proportions to maintain a constant molar ratio of Si:Al in the feed streams of from 1:1 to 19:1 with the rate of addition of silica not to exceed 10 grams of $SiO_2$ per 1000 square meters of total surface area of particles in the heel sol per hour;

(c) maintaining the pH of the heel sol at a constant value between 9 and 12 by adding cation exchange resin in the hydrogen or ammonium form, maintaining the temperature of the heel sol at from 50° to 100° C. until the particles in the heel sol have attained an increase in diameter of at least 1 nanometer and a maximum size of 90 nanometers; and (d) filtering the sol from (c) to remove cation exchange resin and optionally concentrating the sol to a solids content of up to 60% by weight.

4. A method for the preparation of a stable amorphous aluminosilicate sol having uniform, spheroidal, discrete, colloidal particles in the range of 3 to 90 nanometers comprising (a) preparing a heel sol of discrete colloidal particles selected from the group consisting of sodium, potassium or ammonium aluminosilicate, silica and one or more refractory oxides selected from the group consisting of alumina, zirconia, lanthana, thoria, titania and rare earth oxides, said particles having a substantially uniform diameter within the range of 2 to about 85 nanometers, said aluminosilicate having a molar ratio of Si:Al of from 1:1 to 19:1, the initial concentration in the heel sol of sodium, potassium, ammonium aluminosilicate or refractory metal oxide being at least 0.2% by weight, with the particles stabilized against aggregation in the pH range 9 to 12;

(b) adding to said heel, separately but simultaneously, two feed solutions, one being a solution of sodium or potassium silicate having from one to 36 grams of silica per 100 cc, or a sol of silicic acid containing from 1 to 12% silica, the other being a solution of sodium or potassium aluminate containing from 1 to 15% alumina, said feed solutions being added in relative rates and proportions to maintain a constant molar ratio of Si:Al in the feed streams of from 1:1 to 19:1 with the rate of addition of silica not to exceed 10 grams of $SiO_2$ per 1000 square meters of total surface area of particles in the heel sol per hour;

(c) maintaining the pH of the heel sol at a constant value between 9 and 12 by adding cation exchange resin in the hydrogen or ammonium form, maintaining the temperature of the heel sol at from 50° to 100° C. until the particles in the heel sol have attained an increase in diameter of at least 1 nanometer and a maximum size of 90 nanometers; and (d) filtering the sol from (c) to remove cation exchange resin and optionally concentrating the sol to a solids content of up to 60% by weight.

5. The method of claim 4 wherein the pH is constant between 10 and 10.5.

6. The method of claim 4 wherein the discrete colloidal particles are in the range of 15 to 40 nanometers.

* * * * *